United States Patent
Gornowicz et al.

(10) Patent No.: US 7,859,546 B2
(45) Date of Patent: Dec. 28, 2010

(54) PLACING SKIN-ATTACHED FEATURES ON A COMPUTER GENERATED CHARACTER

(75) Inventors: Galen G. Gornowicz, Pasadena, CA (US); Gokhan Kisacikoglu, Redondo Beach, CA (US)

(73) Assignee: DreamWorks Animation LLC, Glendale, CA (US)

( * ) Notice: Subject to any disclaimer, the term of this patent is extended or adjusted under 35 U.S.C. 154(b) by 839 days.

(21) Appl. No.: 11/796,650

(22) Filed: Apr. 27, 2007

(65) Prior Publication Data

US 2008/0266308 A1 Oct. 30, 2008

(51) Int. Cl.
*G09G 5/00* (2006.01)
(52) U.S. Cl. .................................................. 345/581
(58) Field of Classification Search .................. 345/581
See application file for complete search history.

(56) References Cited

U.S. PATENT DOCUMENTS

| | | | |
|---|---|---|---|
| 6,204,860 B1 | 3/2001 | Singh | |
| 6,720,962 B1 | 4/2004 | Alter | |
| 6,952,218 B1 | 10/2005 | Bruderlin | |
| 7,348,973 B1 * | 3/2008 | Gibbs et al. | 345/419 |
| 7,664,325 B2 | 2/2010 | Lin et al. | |
| 2003/0179203 A1 | 9/2003 | Bruderlin et al. | |
| 2005/0012741 A1 * | 1/2005 | Chen et al. | 345/419 |

OTHER PUBLICATIONS

Bishop, R. L. (Mar. 1975). "There is More than One Way to Frame a Curve," *American Mathematical Monthly* 82(3):246-251.
Chen, Y. et al. (Jul. 2002). "Modeling and Rendering of Realistic Feathers," *ACM Transactions on Graphic* 21(3):630-636.
Franco, C. G. et al. (2001). "Modeling the Structure of Feathers," *IEEE Proceedings of the XIV Brazilian Symposium on Computer Graphics and Image Processing (SIGRAPI'01)*, p. 381.
Hanson, A. J. et al. (Jan. 1995). "Parallel Transport Approach to Curve Framing," Department of Computer Science, Indiana University, pp. 1-20.
Kim, T.-Y. et al. (Jul. 2002). "Interactive Multiresolution Hair Modeling and Editing," *ACM Transactions on Graphics* 21(3):620-629.
Parke, F. I. (1972). "Computer Generated Animation of Faces," *Proceedings of the ACM Annual Conference*, pp. 451-457.

(Continued)

*Primary Examiner*—Xiao M Wu
*Assistant Examiner*—Maurice McDowell, Jr.
(74) *Attorney, Agent, or Firm*—Morrison & Foerster LLP

(57) ABSTRACT

Skin-attached features are placed on a computer generated character by defining a set of placement points on at least a portion of a skin surface of the computer generated character. For each placement point, a radius is defined for the placement point. For each placement point, a density value is determined for the placement point. The density value is a sum of weighted overlaps with neighboring placement points within the radius of the placement point. The weighted overlaps are functions of the radius of the placement point. The number of placement points in the set of placement points is reduced based on the density values.

26 Claims, 23 Drawing Sheets

OTHER PUBLICATIONS

Streit, L. et al. (2002). "A Biologically-Parameterized Feather Model," *Eurographics* 2002 21(3):565-574.
Turk, G. (Jul. 1992). "Re-Tiling Polygonal Surfaces," *Computer Graphics* 26(2):55-64.
U.S. Appl. No. 11/408,805, filed Apr. 21, 2006 for Gornowicz et al.
U.S. Appl. No. 11/796,431, filed Apr. 27, 2007 for Kisacikoglu et al.
Non Final Office Action received for U.S. Appl. No. 11/796,431, mailed on Jul. 22, 2010, 20 pages.

* cited by examiner

| Algorithm 1 *placement*(skin, W, I) |
| --- |
| 1: // *Initialize a grid of placement points* |
| 2: for all patches of skin do |
| 3:   Estimate the smallest radius attribute for the skin patch, $r_{min}$. |
| 4:   Calculate the lengths along each parametrization direction of the skin patch, $d_{arc}$. |
| 5:   Divide $d_{arc}$ by $r_{min}$ to estimate the densities required along these parametrization directions. |
| 6:   Populate the grid points. |
| 7: end for |
| 8: Calculate the radius attributes and the surface gradient vectors at every grid point. |
| 9: Apply a spatial subdivision algorithm to each point with the radius $r$. |
| 10: // *Record at each point the overlap densities with the weighting function:* |
| 11: for all points $p_c$ with radius $r_c$ in grid of points do |
| 12:   Find the neighbor points inside the radius $r_c$. |
| 13:   Calculate the inner product of the surface normals for each neighbor point with the point $p_c$. |
| 14:   Reject the neighbor points with the negative inner products. |
| 15:   Store at the point $p_c$ the summation of the weighted overlaps from each neighbor point. |
| 16: end for |
| 17: // *Iterative pairwise reduction of overlapping features* |
| 18: repeat |
| 19:   Find the point with the maximum overlapping weight, $p_{max}$. |
| 20:   Find the next point with the highest overlapping weight, $p_{next}$, within the given radius $r_{max}$ of the point $p_{max}$. |
| 21:   // *Merge the two points:* |
| 22:   Calculate the average point $p_{avg}$ and radius $r_{avg}$. |
| 23:   Find all of the neighboring points affected by $p_{max}$ and $p_{next}$ within their respective radii. |
| 24:   Subtract their overlapping weights from their neighbors and remove them. |
| 25:   Apply the overlap weight of the new point $p_{avg}$ to its neighbors. |
| 26: until $p_{max} < 1.75$ |

FIG. 4

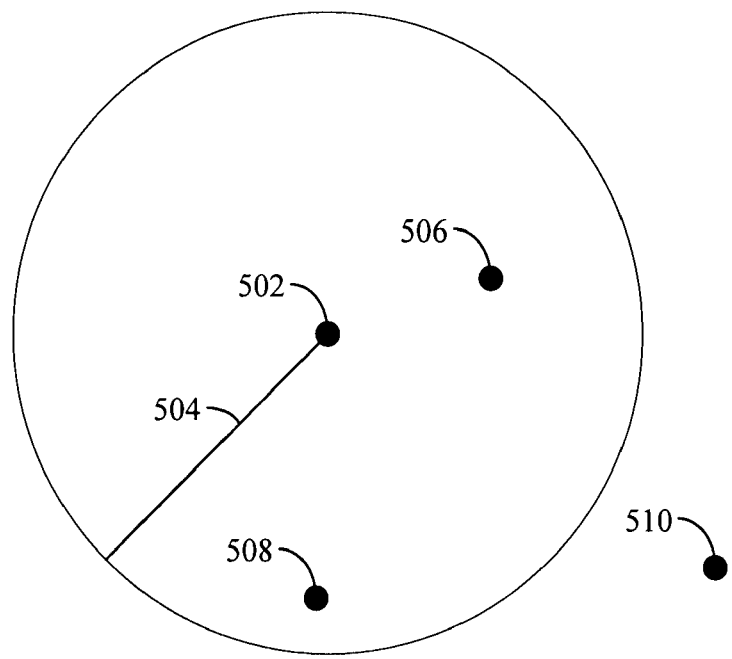
FIG. 5-A
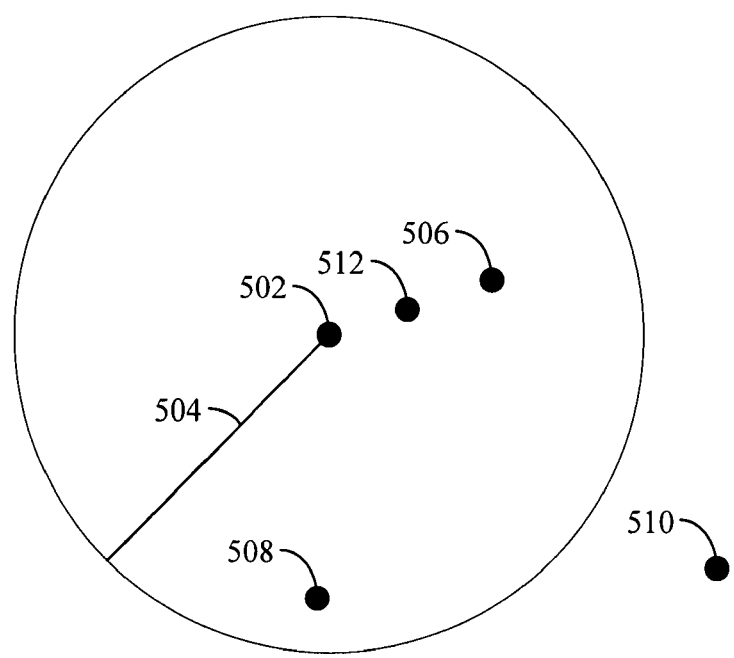
FIG. 5-B

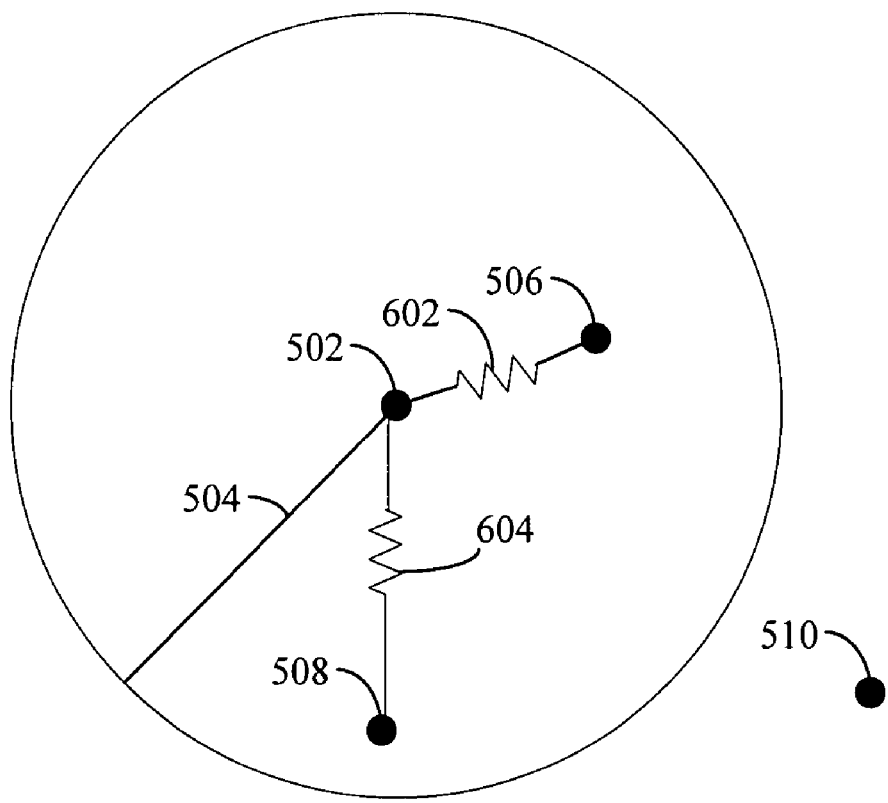
FIG. 6-A
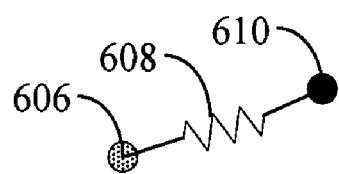
FIG. 6-B

Algorithm 2 *proximity_correction*(P, R)

1: for all point $p_i$ with radius $r_i$ on the skin do
2:    Store the point $p_i$ for the anchor positions, $p_{i_{anchor}}$.
3:    Store all of the indexes of the neighboring points within the radius $2r_i$.
4: end for
5: for $i$ in $N/\Delta t$ do
6:    for all point $p_j$ with radius $r_j$ on the skin do
7:       // Calculate the accelerations from the neighboring points $p_n$;
8:       $A_n = k(|p_n - p_c| - r_c)$.
9:       // Calculate the anchor spring tension;
10:      $A_a = k_a|p_a - p_c|$.
11:      // Calculate the total acceleration;
12:      $A = A_n + A_a$.
13:   end for
14: end for
15: Advance all of the points by using the total accelerations for the time step $\Delta t$.
16: Store the closest points on the skin as the new positions.

FIG. 7

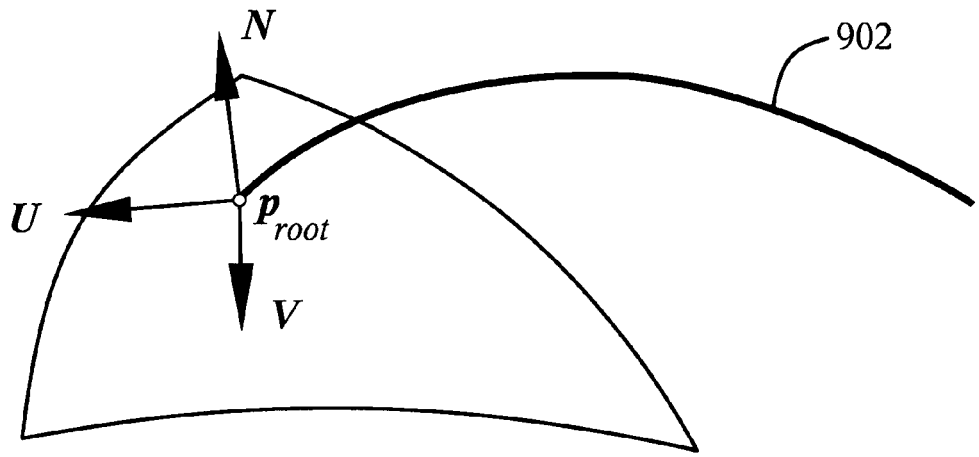
FIG. 10-A
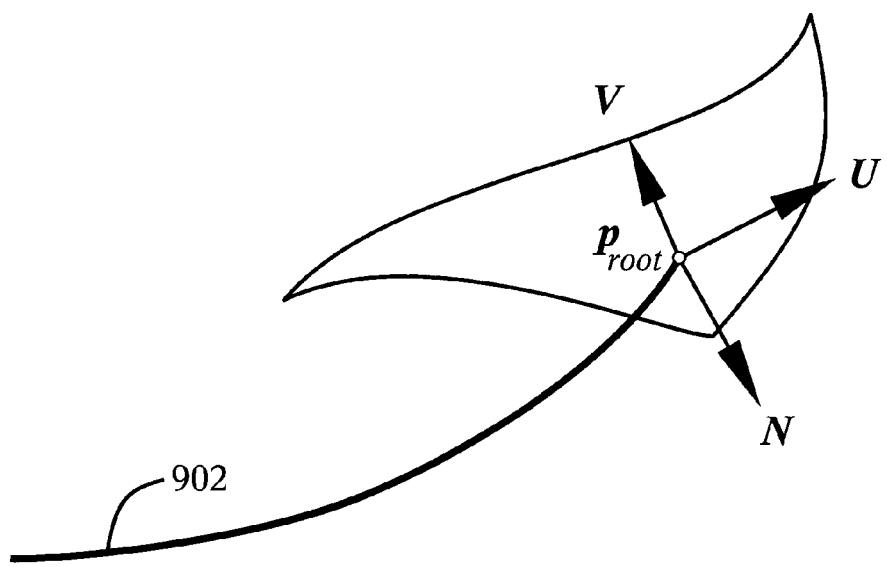
FIG. 10-B

| Algorithm 3 $guide\_weights(\mathbf{P}, \mathbf{R}, \mathbf{S})$ |
| --- |
| 1: for all guide locations $p_i$ with radius $r_i$ in $\mathbf{P}, \mathbf{R}$ do |
| 2:    Find the closest paths on the skin within $3r_i$ by the bisection method. |
| 3:    Store the surface normal at each path segment and calculate its total length. |
| 4:    Discard the paths that have segments that are near perpendicular angles. |
| 5: end for |
| 6: Apply a spatial subdivision algorithm to each segment of the paths. |
| 7: repeat |
| 8:    for all paths $path_{ij}$ between guides do |
| 9:       for all segments $seg_k$ in $path_{ij}$ do |
| 10:          $\mathbf{N} \leftarrow$ average surface normal of skin $\mathbf{S}$ along segment. |
| 11:          Find any neighboring segments $seg_l$ on neighboring paths within bounding box. |
| 12:          Project each segment to the surface plane along vector $\mathbf{N}$. |
| 13:          Perform a $2D$ linear intersection test between $seg_k$ and $seg_l$. |
| 14:          if paths intersect then |
| 15:             eliminate the longer path. |
| 16:             if If the current path is eliminated then |
| 17:                break |
| 18:             else |
| 19:                continue |
| 20:             end if |
| 21:          end if |
| 22:       end for |
| 23:    end for |
| 24:    For each path, reset its shared edge count to zero. |
| 25:    For each guide, trace the loops by using no more than three edges to form a triangle. |
| 26:    Increase the shared count of the traversed edges that form a triangle. |
| 27:    Reject the triangles that have two edges shared more than twice. |
| 28:    Gather the user input of edges to be discarded |
| 29: until No more user input |

FIG. 14

| Algorithm 4 $interpolate\_shape(\text{guides}, W)$ |
| --- |
| Ensure: $\sum_i W_i = 1$ |
| Ensure: surface names and topologies match forall guides |
| 1: $m \leftarrow dim(\text{guides}_0)$ |
| 2: for $j = 1$ to $m$ do |
| 3:     $\text{shape}_j \leftarrow \text{guides}_{0j} * W_0$ |
| 4: end for |
| 5: $n \leftarrow dim(\text{guides})$ |
| 6: for $i = 2$ to $n$ do |
| 7:     for $j = 1$ to $m$ do |
| 8:        if $res(\text{shape}_j)$ not equal to $res(\text{guides}_{ij})$ then |
| 9:           Find matching resolution. |
| 10:          Subdivide $\text{shape}_j, \text{guides}_{ij}$ |
| 11:        end if |
| 12:        $\text{shape}_j \leftarrow \text{shape}_j + \text{guides}_{ij} * W_i$ |
| 13:     end for |
| 14: end for |
| 15: $return$ shape |

FIG. 17

| Algorithm 5 $interpolate\_deformer(\text{guides}, X, W, I, x_0)$ |
| --- |
| Ensure: $\sum_j^{dim(W)} W_j = 1$, $dim(X) = dim(W) = dim(I)$ |
| 1: $n \leftarrow dim(X)$ |
| 2: for $j = 1$ to $n$ do |
| 3:     $translate$ $\text{guides}[I_j]$ by $x_0 - X[I_j]$ |
| 4: end for |
| 5: Deformer $\leftarrow \sum_j^{dim(W)} \text{guides}[I_j] * W_j$ |
| 6: $return$ Deformer |

FIG. 18

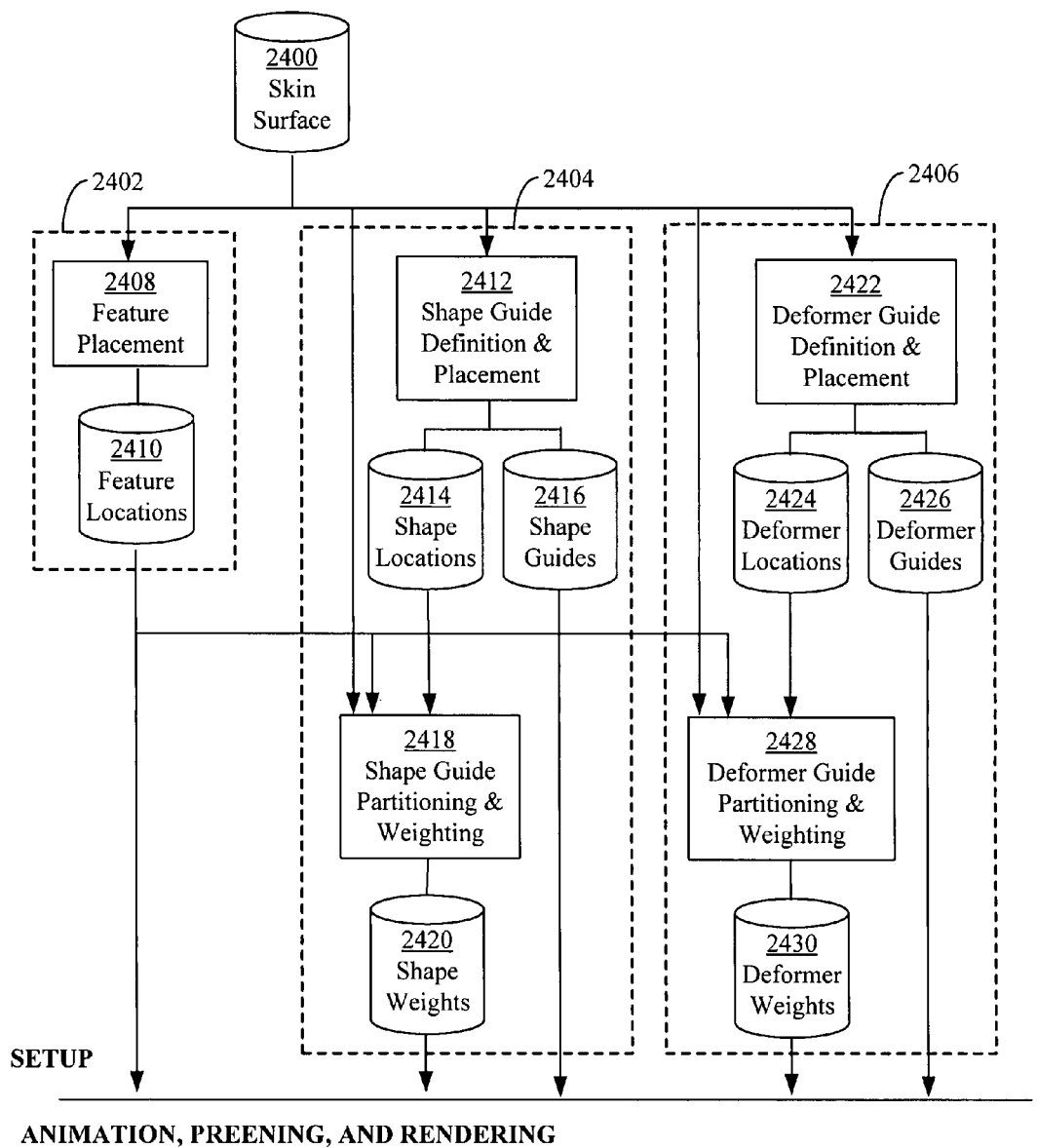
FIG. 24-A

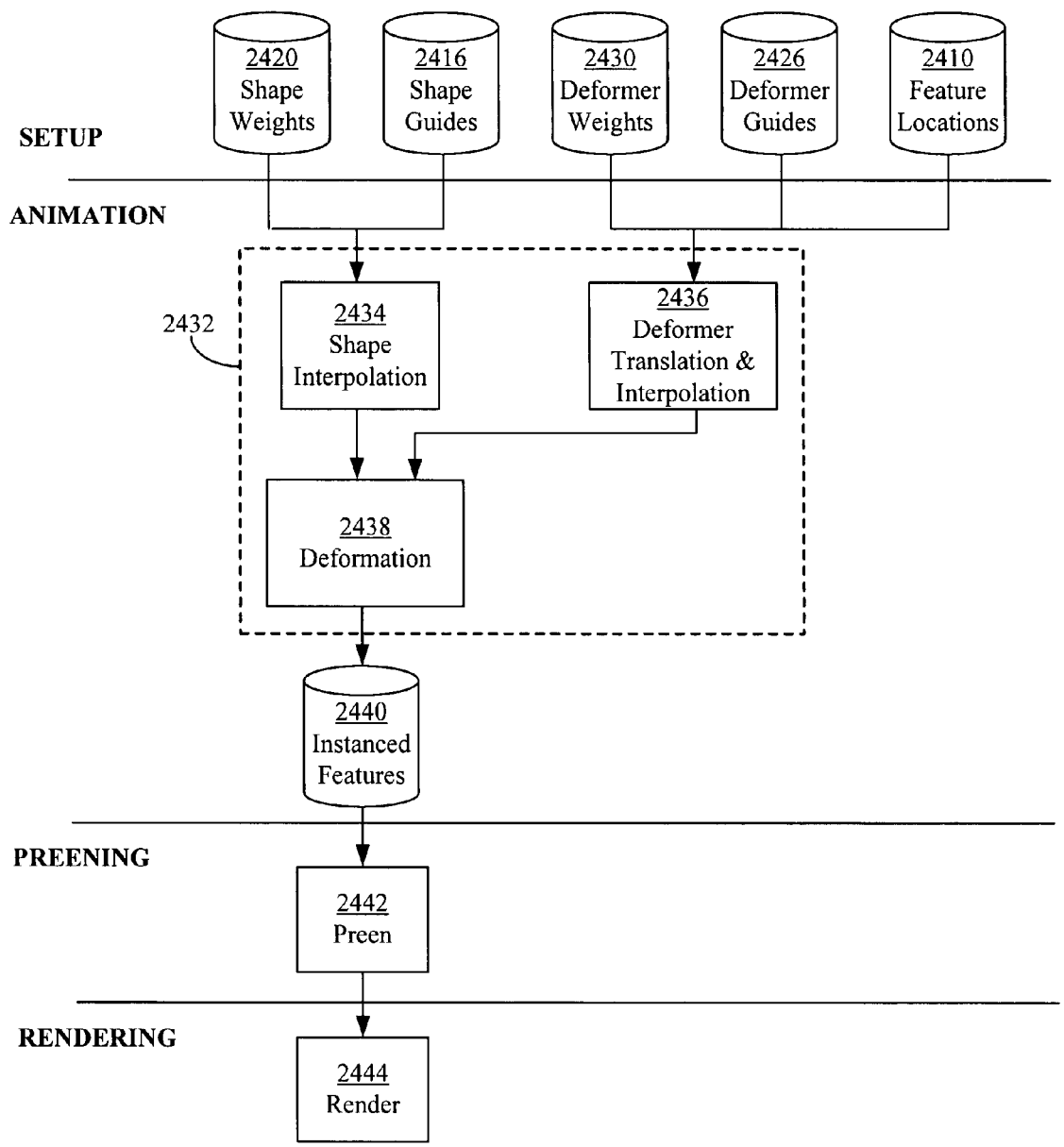
FIG. 24-B

```
shapeGuide100 Shared {
    baseShape Map {
surface Map {
    r_vane Surfs shapeGuides.ms 1 [ wingFtr_r_barb ]
    l_vane Surfs shapeGuides.ms 1 [ wingFtr_l_barb ]
    m_shaft Surf shapeGuides.ms wingFtr_m_shaft
}
    }
    surfUV Vec2F 0.889362 0.031858
    surfName String l_arm
    typeId Int 1
    shapeGroup String LGPCovert
}
```

FIG. 25

```
deformerGuide100 Shared {
    surfUV Vec2F 0.889361 0.031858
    surfName String l_arm
    typeId Int 2
    orientTransform Mat4F
0.0882156 0.9949496 0.04788722 0
-0.1331794 -0.03586218 0.9904429 0
0.9871582 -0.0937501 0.1293432 0
0 0 0 1
    deformerGroup String LGPCovert
    spineCurve Curve deformerGuides.mc spine
}
```

FIG. 26

```
m_body523 Shared {
    guideIds Ints 3 [ shapeGuide154 shapeGuide155 shapeGuide156 ]
    guideWeights Floats 3 [ 0.2285082 0.5429866 0.2285051 ]
}
```

FIG. 27

```
m_body523 Shared {
    baseShape Map {
surface Map {
    r_vane Surfs instances.ms 1 [ m_body_outvane523 ]
    l_vane Surfs instances.ms 1 [ m_body_invane523 ]
    m_shaft Surf instances.ms m_body_shaft523
}
    }
    surfUV Vec2F 0.499998 0.150437
    surfName String m_head
    typeId Int 0
    surfaceNames Strings 3 [ m_body_shaft523 m_body_invane523 m_body_outvane523 ]
    texUV Vec2F 0.5000001 0.2028141
    worldTransform Mat4F
1 0 0 0
0 1 0 0
0 0 1 0
0 0 0 1
    surfaceGroup String body
}
```

FIG. 28

PLACING SKIN-ATTACHED FEATURES ON A COMPUTER GENERATED CHARACTER

BACKGROUND

1. Field

The present application generally relates to animation technology, and, more particularly, to placing skin-attached features on a computer-generated character.

2. Related Art

Media productions have employed increasingly complex animations in order to construct increasingly realistic images. In addition to animating surfaces, increasing attention has been directed towards surface-attached features including hairs, fur, scales, and feathers. See, U.S. Patent Publication No. 2003/0179203; U.S. Pat. Nos. 6,720,962; 6,952,218; and Kim, T.-Y., and Newmann, U., Interactive Multiresolution Hair Modeling and Editing, *ACM Transactions on Graphics* 21, 3, pp 620-629 (July 2002).

Feathers, in particular, have been a challenging feature since the early days of animation. Birds of early animation films were often secondary characters with relatively few unrealistic feathers. Although more realistic effects have been achieved in modern animation, challenges remain especially for animating birds with a large number of feathers throughout an animation sequence. The visual complexity in producing believable bird characters requires realization of their numerous feathers in relation to a skin surface. The approximation of such skin covered with attached features as feathers, scales, hair, and fur adds considerable challenges beyond typical character animation.

Depending on the degree of modeling complexity, there may be numerous feather-describing attributes that can be represented by either a small set of numbers (e.g., length and width) or with more detailed parametric shape information. Numerous papers have proposed various parametric models of feathers. See, Franco, C. G., and Walter, M., Modeling the Structure of Feathers, *sibgrapi* 00, p. 381 (2001); Chen, Y., Xu, Y., Guo, B., and Shum, H.-Y., Modeling and Rendering of Realistic Feathers, *ACM Transactions on Graphics* 21, 3, pp. 630-636 (July 2002); and Streit, L., and Heidrich, W., A biologically parameterized feather model, *Computer Graphics Forum* 21, 3, pp. 565-574 (2002). The animation of these attached features in conjunction with the corresponding skin surface presents substantial challenges for existing animation technology.

Thus, there is a need for improved animation for characters with surface-attached features, such as hairs, fur, scales, and feathers.

SUMMARY

In one exemplary embodiment, skin-attached features are placed on a computer generated character by defining a set of placement points on at least a portion of a skin surface of the computer generated character. For each placement point, a radius is defined for the placement point. For each placement point, a density value is determined for the placement point. The density value is a sum of weighted overlaps with neighboring placement points within the radius of the placement point. The weighted overlaps are functions of the radius of the placement point. The number of placement points in the set of placement points is reduced based on the density values.

BRIEF DESCRIPTION OF THE DRAWINGS

The present application can be best understood by reference to the following description taken in conjunction with the accompanying drawing figures, in which like parts may be referred to by like numerals:

FIG. 4 depicts pseudo-code for an exemplary placement process and density elimination process.

FIGS. 5-A and 5-B depict exemplary placement points.

FIGS. 6-A and 6-B depict exemplary placement points.

FIG. 7 depicts pseudo-code for an exemplary proximity correction process.

FIGS. 10-A and 10-B depict an exemplary spine curve of a deformer guide.

FIG. 14 depicts exemplary pseudo-code for an exemplary partitioning process.

FIG. 17 depicts pseudo-code for an exemplary shape interpolation process.

FIG. 18 depicts pseudo-code for an exemplary deformer interpolation process.

FIG. 24-A depicts an exemplary setup system of an animation pipeline system.

FIG. 24-B depicts an exemplary animation, preening, and rendering systems of the animation pipeline system.

FIG. 25 depicts an exemplary data listing of a shape guide.

FIG. 26 depicts an exemplary data listing of a deformer guide.

FIG. 27 depicts an exemplary data listing of interpolation weights for a feature location.

FIG. 28 depicts an exemplary data listing of an instanced feature.

DETAILED DESCRIPTION OF EXEMPLARY EMBODIMENTS

The following description sets forth numerous specific configurations, parameters, and the like. It should be recognized, however, that such description is not intended as a limitation on the scope of the present invention, but is instead provided as a description of exemplary embodiments.

1. Overview

Figure 1:
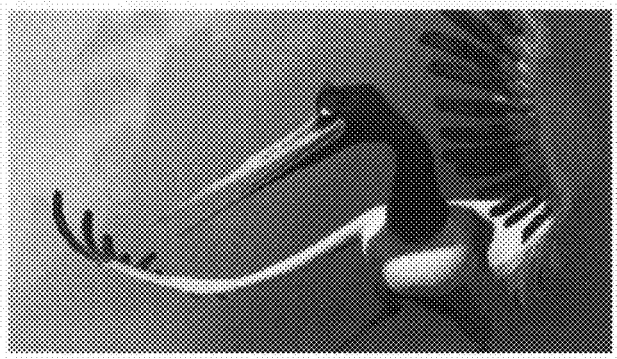
FIG. 1 depicts an exemplary feathered character that illustrates the complexity of the feather animation process.

FIG. 1 shows an exemplary computer generated character that illustrates the complexity of the animation process. The computer generated character depicted in FIG. 1 is a bird covered with feathers. For the sake of clarity and convenience, various exemplary embodiments of the animation process will be described below with reference to animating a bird covered with feathers similar to the bird depicted in FIG. 1. It should be recognized, however, that the animation process described below can apply to various types of computer generated characters, real and imaginary, having various types of skin-attached features, including hair, fur, scales, and the like.

Figure 2:
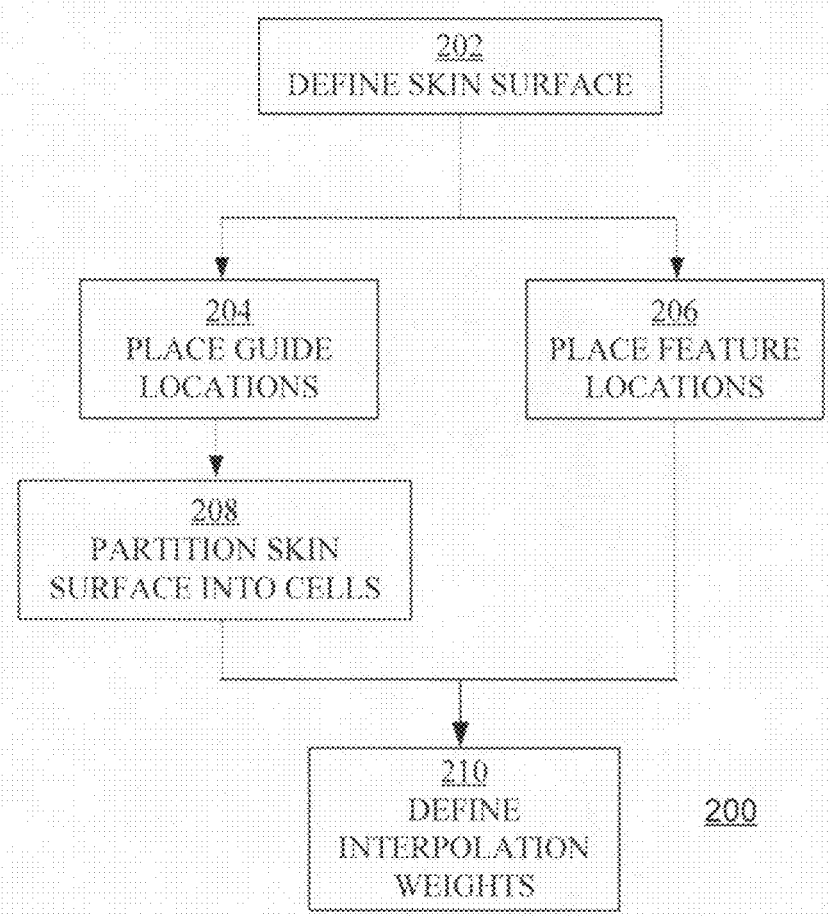
FIG. 2 depicts a flow chart of an exemplary process of decorating a computer generated character.

With reference to FIG. 2, an exemplary process 200 is depicted of decorating a computer generated character with skin-attached features. It should be recognized that process 200 can be preceded by any number of prior processes performed as part of an animation process for the computer generated character. For example, the basic shape of the computer generated character can be created in an earlier process. Also, any number of subsequent processes can be performed subsequent to process 200 as part of the animation process for the computer generated character. For example, the movement of the computer generated character can be created in subsequent processes.

In step 202 of process 200, a skin surface of the character is defined. The skin surface is defined using a set of one or more connected parametric surfaces.

In step 204, guide locations for guides are placed on the skin surface defined in step 202. As will be described in more detail below, each guide includes a set of attributes used to define the attributes of features neighboring the guide.

In step 206, feature locations for the skin-attached features are placed on the skin surface defined in step 202. The feature locations can be defined independent of the guide locations. Thus, step 206 can be performed before, concurrently, or after step 204.

In step 208, the skin surface is partitioned into a plurality of cells. Each cell has a set of vertices. The set of vertices for each cell being a set of the guide locations defined in step 204. Step 208 is performed after step 204. However, step 206 can be performed before, concurrently, or after step 208.

In step 210, interpolation weights for the feature locations are defined using the guide locations in step 204 and the plurality of cells resulting from step 208. Thus, step 210 is performed after step 208. Additionally, step 204 is performed before step 210.

As noted above, steps 202-210 of process 200 need not be performed in the order in which they are depicted in FIG. 1. Additionally, it should be recognized that process 200 can include numerous additional intermediate steps. Various aspects of steps 202-210 of process 200 are described in more detail below.

2. Skin Surface

As described above, the skin surface of the character can be defined using a set of one or more connected parametric surfaces each identified by a unique name. Each parametric surface has unique local positions and the appropriate transformation to enable local to global translations for an outside observer. It is at least first order differentiable in order to obtain the gradient vectors. The gradient vectors are used to establish a local space at the surface position.

Figure 3:
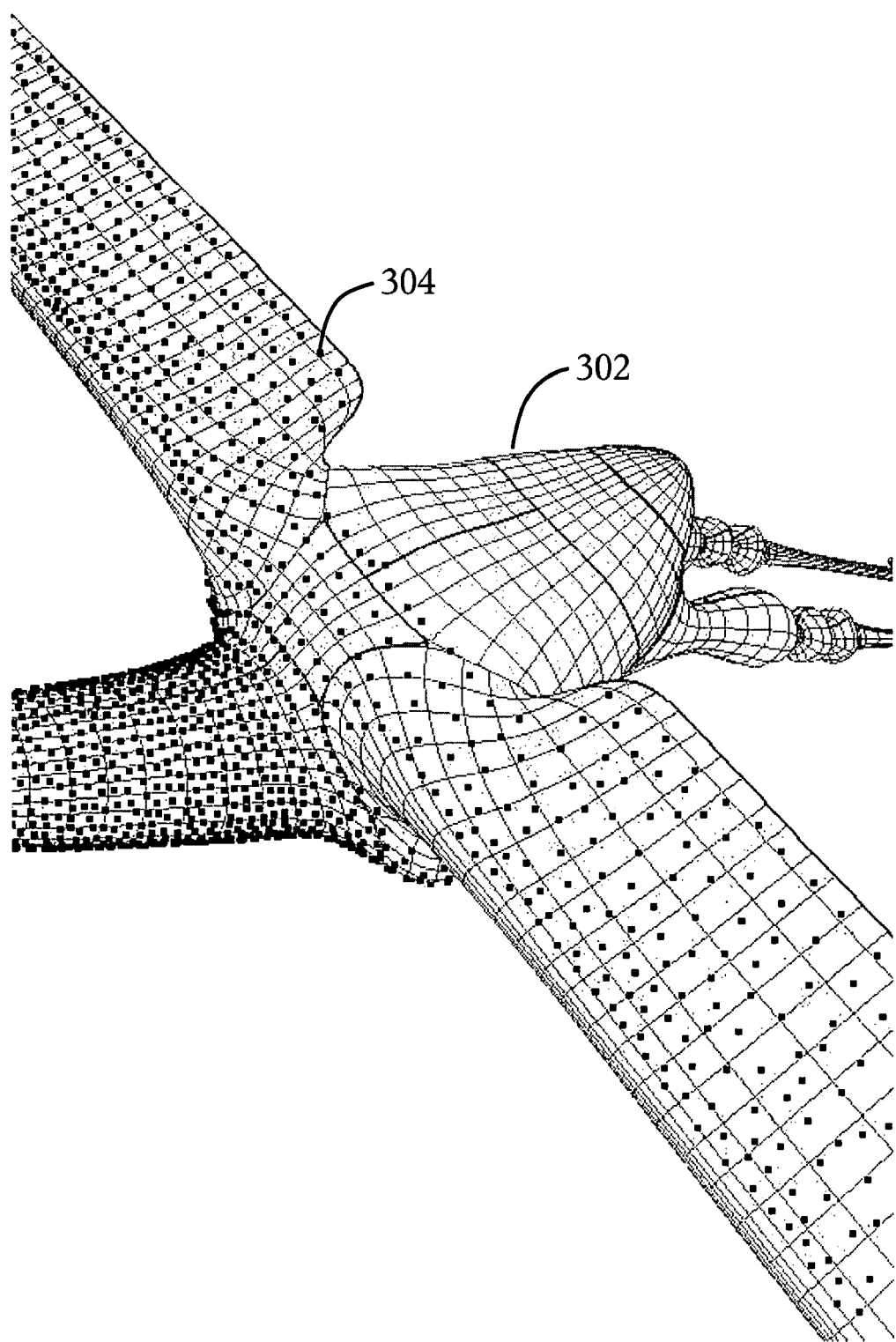
FIG. 3 depicts an exemplary skin surface of a computer generated bird character.

For example, FIG. 3 depicts a skin surface 302 defined using a bi-cubic NURBS surface representation, which is a $C^2$ (twice continuously differentiable) two-manifold embedded in Euclidean 3-space $R^3$, and parameterized by a 2 dimensional vector u or (u, v). However, the rules can be generalized with the appropriate changes according to the different surface representations. The generalized skin surface will hence be denoted as S(u).

3. Placement

In one exemplary embodiment, to decorate the computer generated character with skin-attached features, a set of placement points is placed on the skin surface. For example, FIG. 3 depicts a plurality of placement points 304 on skin surface 302.

As will be described below in more detail, the placement points can correspond to locations of guides and/or of features on the skin surface. The guides include shape guides, which define the shapes of the features, and deformer guides, which define the deformation properties of the features. As mentioned above, the features can include hairs, fur, scales, feathers, and the like.

In the present exemplary embodiment, an initial set of placement points is placed on one or more portions/patches of the skin surface using an automated process. For example, for patches of the skin surface on which the set of placement points is to be placed, an estimated minimum radius, $r_{min}$, is defined for each point. Arc lengths, $d_{arc}$, along each parameterization direction of the skin surface are calculated. The arc lengths are divided by the estimated minimum radius to determine the estimated densities along each parameterization directions of the skin surface. The placements points are placed in the skin patch based on the estimated densities.

In the above example, values for the estimated minimum radius can be initially selected by the user to address different size and density requirements of the characteristic of the computer generated character. For example, it may be desirable for certain parts of the skin surface to be bald. The size of the feature can also vary across the skin surface, such as small and large feathers around the neck and chest of a bird.

Exemplary pseudo-code for implementing an exemplary initial placement process is provided in lines 1-7 of FIG. 4. It should be recognized, however, that the initial set of placement points can be placed using various known automated placement procedures.

4. Density Elimination

In one exemplary embodiment, after the initial set of placement points has been placed, a density elimination process can be performed to achieve a desired density of placement points on the skin surface. For each placement point, a radius is defined for the placement point. For each placement point, a density value is also determined for the placement point. As will be described in more detail below, the density value for a placement point is the sum of weighted overlaps with neighboring placement points within the radius of the placement point. The weighted overlaps are functions of the radius of the placement point. The number of placement points is reduced based on the density values of the placement points.

In the present exemplary embodiment, the density value for a placement point is determined by identifying the neighboring placement points within the radius of the placement point. For each identified neighboring placement point, a weighted overlap is determined between the placement point and the neighboring placement point. The weighted overlap is a function of the location of the neighboring placement point on the radius of the placement point. For example, the weighted overlap can decrease along the radius of the placement point, such as defined by a Gaussian falloff function. Thus, the farther out on the radius of the placement point the neighboring placement point is located, the smaller the weighted overlap.

For example, FIG. 5-A depicts a placement point 502 having a radius 504. As depicted in FIG. 5-A, assume placement points 506 and 508 are located within radius 504. As also depicted in FIG. 5-A, assume that placement point 508 is located farther out on radius 504 of placement point 502 than placement point 506. Thus, the weighted overlap between placement points 502 and 508 is less than the weighted overlap between placement points 502 and 506. The density value for placement point 502 is the sum of the weighted overlaps. For example, assume the weighted overlap between placement points 502 and 506 is 1.2 and the weighted overlap between placement points 502 and 508 is 0.6. Thus, the density value for placement point 502 is 1.8 (i.e., 1.2+0.6). In the present exemplary embodiment, the number of placement points is reduced by identifying a point with the highest density value. In particular, a neighboring placement point with the next highest density value within the radius of the point is identified. The two placement points are then merged.

For example, referring again to FIG. 5-A, assume placement points 502, 506, 508, and 510 have density values of 1.8, 1.6, 1.2, and 0.8, respectively. Thus, in this example, placement point 502 has the highest density value. As depicted in FIG. 5-A, placement points 506 and 508 are located within radius 504 of placement point 502. Because placement point 506 has the next highest density value, placement points 502 and 506 are merged.

In the present exemplary embodiment, two placement points are merged by adding a new placement point between the two placement points being merged. The new placement point has a radius that is an average of the radii of the two placement points being merged. The two placement points being merged are removed. Neighboring placement points within the radius of either of the two placement points being merged are identified. New density values are determined for the new and the neighboring placement points.

For example, referring again to FIG. 5-B, a new placement point 512 is added between placement points 502 and 506, which are being merged. New placement point 512 has a radius that is an average of the radii of placement points 502 and 506. Neighboring placement point 508 is identified as having been located within the radius of placement point 502 and/or placement point 506. Thus, new density values of new placement point 512 and placement point 508 are determined. Note, in the present example, a new density value of placement point 510 is not determined because placement point 510 is assumed not to be located within the radii of placement points 502 and 506.

In the present exemplary embodiment, the process described above for reducing the number of placement points can be repeated until a desired density is achieved. For example, the number of placement points can be reduced until the highest density value of any placement point is less than a specified density value. For example, typically about 2-3 overlaps per placement point is desirable. To achieve this desired density using the weighted overlaps described above, a specified density value of 1.75 can be used.

In the present exemplary embodiment, after neighboring placement points are identified within a radius of a particular placement point, placement points that may be located on the other side of the skin surface are identified and removed. In particular, for each neighboring placement point, an inner product is calculated for a surface normal for the neighboring placement point and a surface normal of the particular point. The neighboring points with negative inner products are removed.

The process of calculating the density values for the placement points can be time consuming. Thus, in the present exemplary embodiment, various spatial subdivision schemes, which are known in computer graphics applications, can be used to accelerate the process. Generally, a hierarchical grid can be used.

Exemplary pseudo-code for implementing an exemplary density elimination process is provided in lines 8-26 of FIG. 4.

5. Proximity Correction

In one exemplary embodiment, a proximity correction process, which is a relaxation process, can be performed to remove any remaining distribution artifacts from the density elimination process. For each placement point, a first acceleration is calculated for the placement point from each neighboring placement point. The first acceleration is calculated using a model of the placement point anchored to each neighboring placement point with a spring. A second acceleration is calculated for the placement point from a location on the skin surface. The second acceleration is calculated using a model for the placement point anchored to the location on the skin surface with another spring. A total acceleration is calculated as a sum of the first and second accelerations. A new location for the placement point is determined based on the total acceleration.

For example, with reference to FIG. 6-A, assume placement point 502 has a radius of 504. As depicted in FIG. 6-A, to calculate the first acceleration for placement point 502 from neighboring placement point 506, a model is used of placement point 502 being anchored to placement point 506 with a spring 602 with an assumed mass normalized spring constant k. Thus, the first acceleration for placement point 502 from neighboring placement point 506 is calculated as k*(|distance between placement point 502 and neighboring placement point 506−radius 504|). To calculate the first acceleration for placement point 502 from neighboring placement point 508, a model is used of placement point 502 being anchored to placement 508 with a spring 604 with an assumed mass normalized spring constant k. Thus, the first acceleration for placement point 502 from neighboring placement point 506 is calculated as k*(|distance between placement point 502 and neighboring placement point 508−radius 504|). In the present exemplary embodiment, the mass normalized spring constant k for spring 602 is assumed to be the same as the mass normalized spring constant k for spring 604.

With reference to FIG. 6-B, to calculate the second acceleration for placement point 502 (FIG. 6-A), a model is used of the placement point being anchored to its initial location 606 on the skin surface with a spring 608 with a mass normalized spring constant $k_a$. Note, FIG. 6-B depicts the placement point having been displaced to a new position 610 from initial location 606. Thus, the second acceleration for the placement point is calculated as $k_a$*|distance between new position 610 and initial location 606|. In the present exemplary embodiment, the mass normalized spring constant $k_a$ for spring 608 is different than the mass normalized spring constant k for springs 602 and 604.

Exemplary pseudo-code for implementing an exemplary proximity correction process is provided in FIG. 7.

6. Semi-Manual Placement

In one exemplary embodiment, portions of the placement points can be placed using a semi-manual placement process. In particular, a curve on the skin surface can be first defined by a user using a set of control points. Placement points are then automatically placed using the control points on the curve. The placement points can be modified by adjusting the curve.

For example, flight feathers and covert feathers can be placed on a bird's wing using a semi-manual placement process. On a bird's wing, feathers align in rows. A user defines a curve on the skin surface on the bird's wing, then hundreds of feathers can be placed algorithmically based on control points on the curve. For example, feathers can be placed at even parametric values along the curve. By retaining the curve, hundreds of feather positions can be modified later by adjusting the curve.

7. Manual Placement

In one exemplary embodiment, portions of the placement points can be placed using a manual placement process. Additionally, the placement points placed using an automated or semi-manual process can be modified using a manual placement process.

8. Guides

As mentioned above, the placement points can correspond to locations of guides and/or of features on the skin surface. As also mentioned above, the features can include hairs, fur, scales, feathers, and the like. The features are also referred to as instanced primitives or simply instances. There can be several thousand features required to decorate a character. The assignment of shape and deformation properties of the features can be simplified by using guides, which determine the physical characteristics or attributes of each feature within a local region on the skin surface. The goal is to control a group of features with as few guides as possible.

In one exemplary embodiment, two primary types of guides are used (shape and deformer guides). The two types of guides are independent of one another in terms of their placement on the skin surface as well as overall count. Each guide's parameters can be animated in time to achieve special effects such as the wind, collisions, or different expressions depending on the character animation and storyboards.

Figure 8:
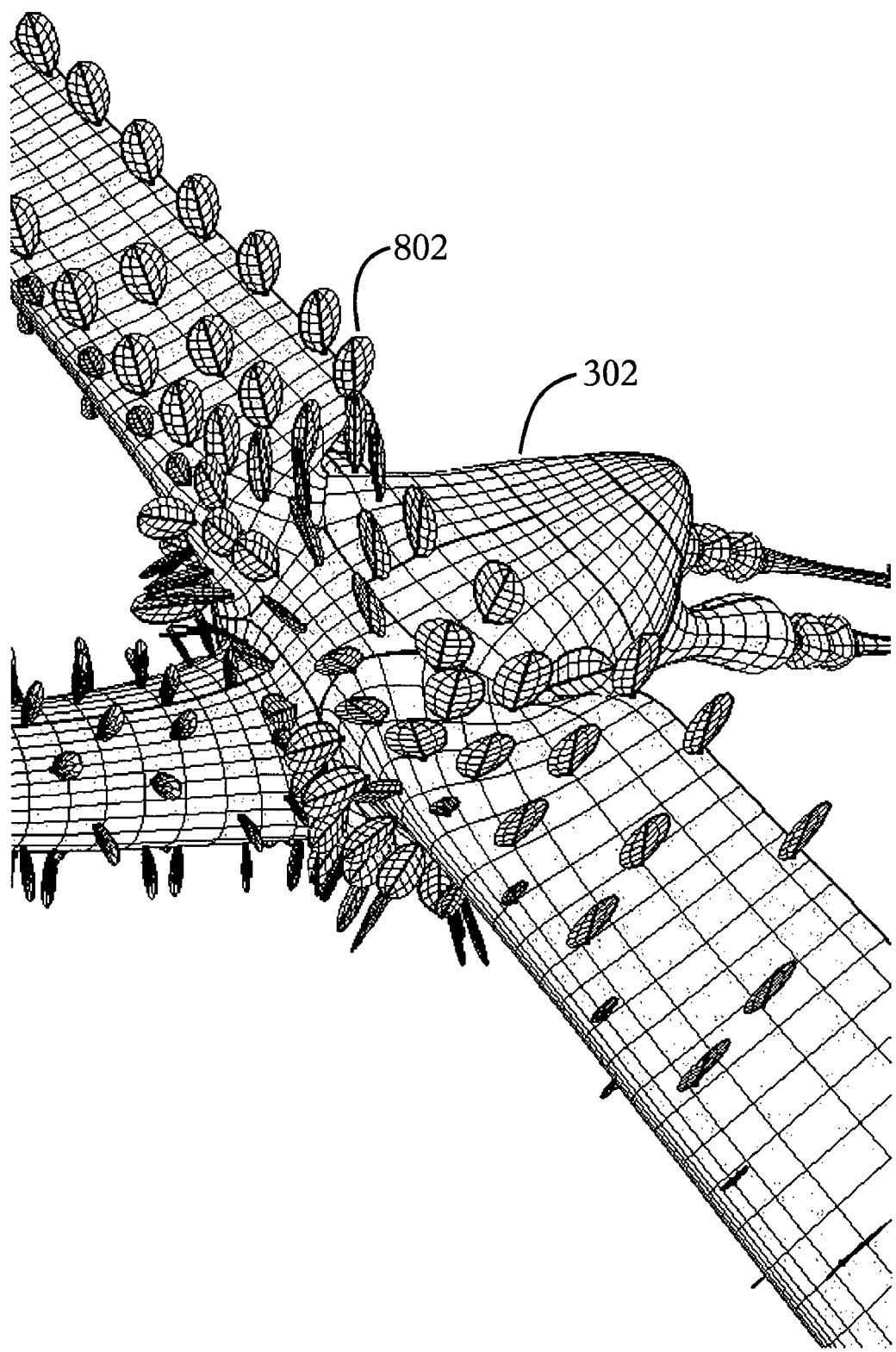
FIG. 8 depicts an exemplary set of shape guides placed on a skin surface.
Figure 9:
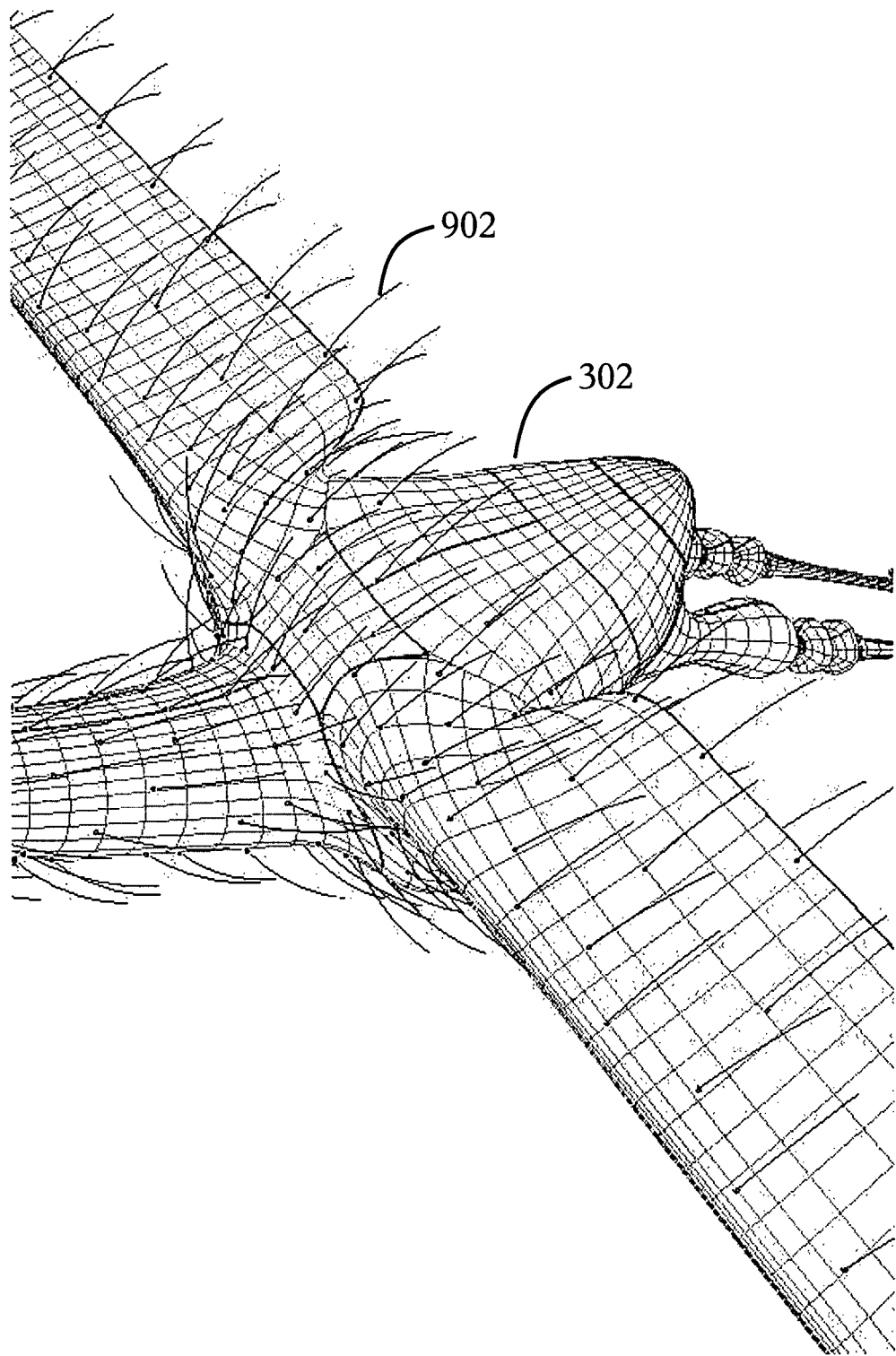
FIG. 9 depicts an exemplary set of deformer guides placed on a skin surface.

FIG. 8 depicts a set of shape guides 802 placed on skin surface 302. Shape guides 802 assign the attributes that are generally invariant under animation, such as the size of the features. FIG. 9 depicts a set of deformer guides placed on skin surface 302. The deformer guides generally establish the relations after the skin deformations due to the animation of the characters. The deformer guides in FIG. 9 include spine curves 902.

In the present exemplary embodiment, guides are animated by constraining them to move with the small localized patch of skin surface at their prescribed attachment point. Once the attachment association is made during setup it can be efficiently evaluated at any frame of animation.

For example, with reference to FIG. 10-A, spine curve 902 of a deformer guide is modeled and stored in a local orthonormal space that is uniquely defined by its location on the skin surface. The UVN coordinate frame is determined by the position of the attachment point on the skin surface as well as the first partial derivatives of the skin surface at the attachment point. FIG. 10-B shows the same deformer guide at some later time when the skin surface has undergone transformation and deformation by any number of typical animation processes. As depicted in FIG. 10-B, the deformer guide is invariant with respect to the UVN coordinate frame under skin deformation, i.e., it simply moves with the same rigid translation and rotation of UVN.

9. Partitioning

In one exemplary embodiment, the skin surface is partitioned into a plurality of cells. Each cell having a set of vertices. The set of vertices for each cell being a set of guide locations.

Figure 11:
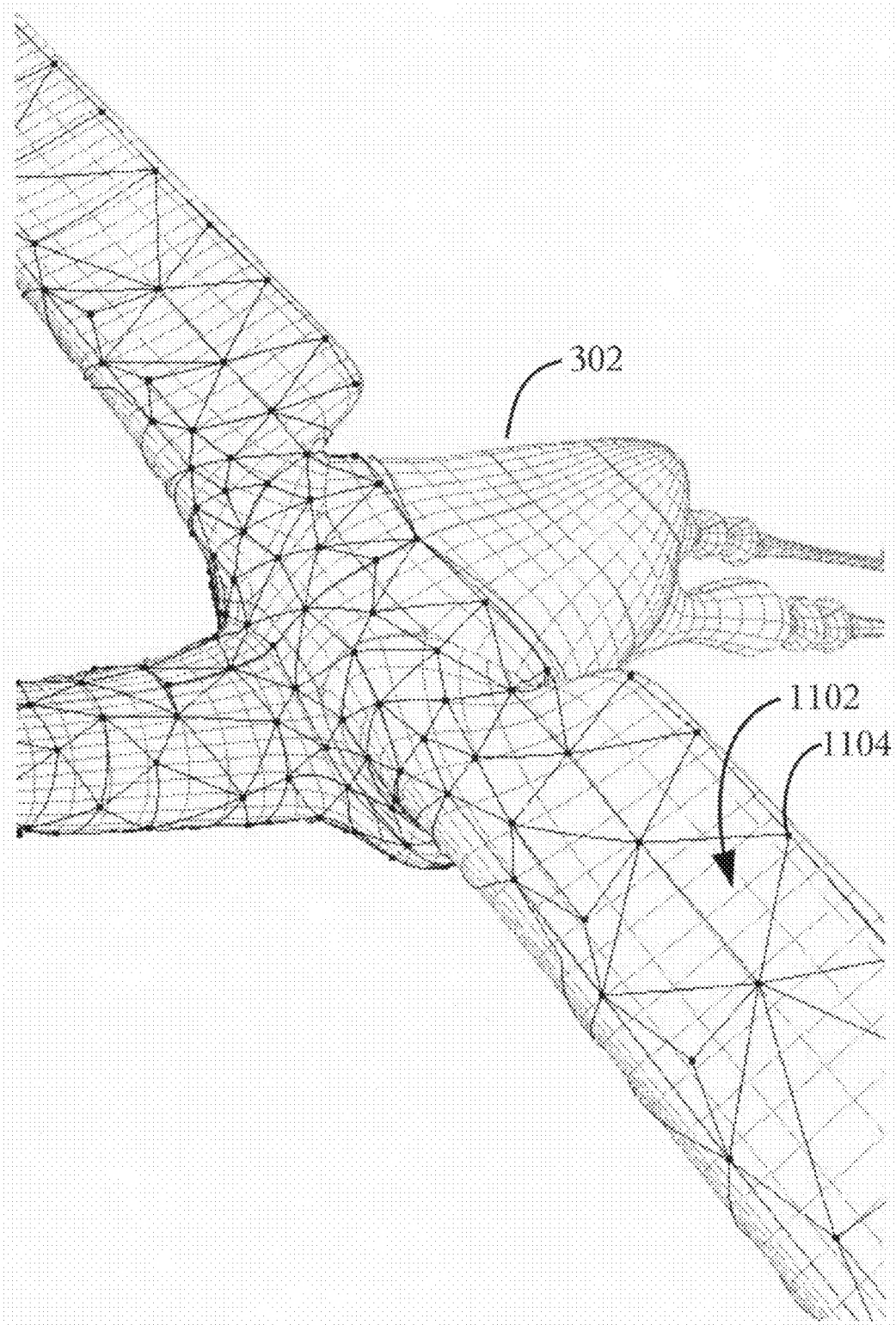
FIG. 11 depicts an exemplary skin surface partitioned into triangular cells.
Figure 12:
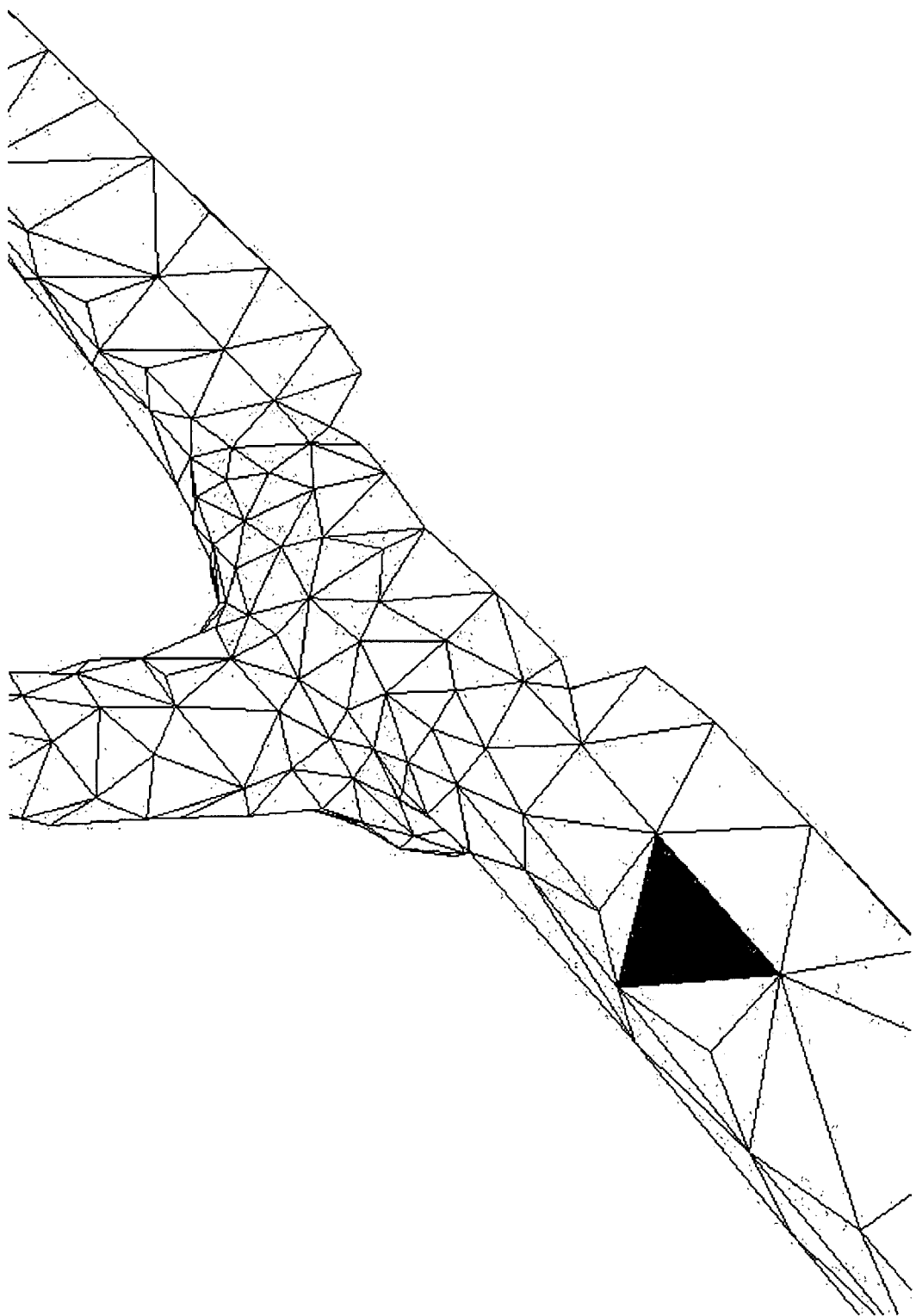
FIG. 12 depicts the triangular cells of FIG. 11 with the skin surface removed.

For example, FIG. 11 depicts skin surface 302 partitioned into triangular cells 1102. Each triangular cell 1102 has three vertices, each being a guide location 1104. In the example depicted in FIG. 11, skin surface 302 is depicted as partitioned into Delaunay triangular cells around guide locations 1104. For the sake of clarity, FIG. 12 shows the triangular cells with the skin surface removed.

In the present exemplary embodiment, the selection criteria used is the shortest distance traveled on the skin surface in between two guide locations. In particular, for each guide location, a set of possible paths on the skin surface between the guide location and all guide locations within a range of the guide location is determined. Intersecting paths in the set of possible paths are identified. When intersecting paths are identified, the shortest paths are retained, and the remaining intersecting paths are discarded.

Figure 13:
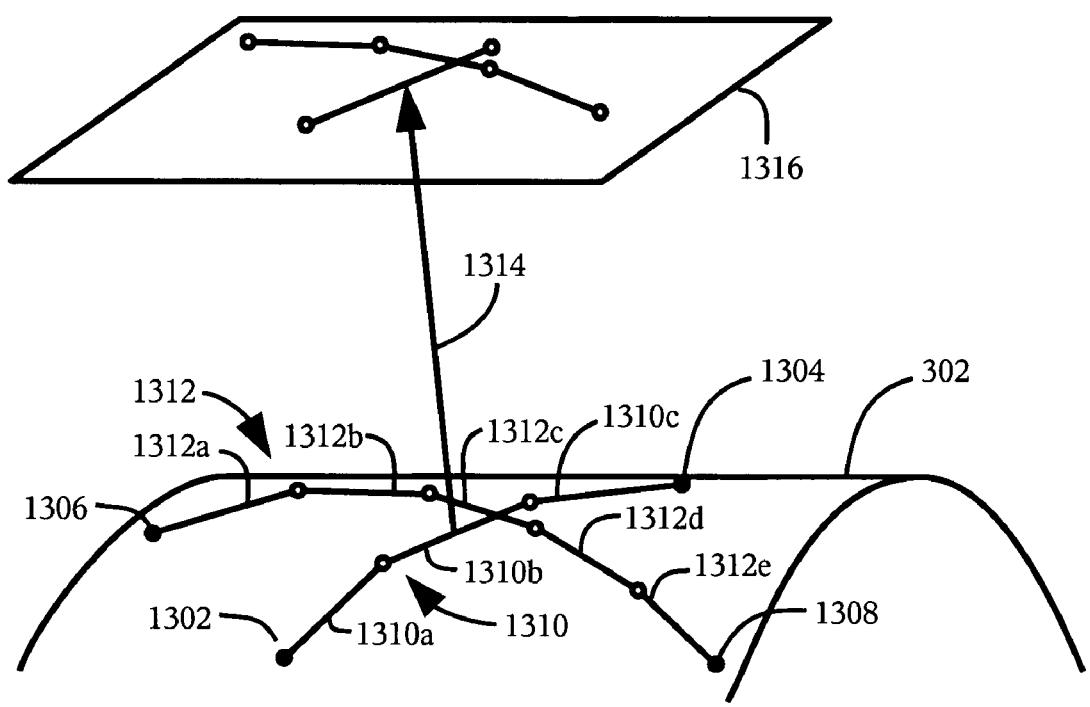
FIG. 13 depicts exemplary paths defined between guide locations on a portion of a skin surface.

Intersecting paths can be identified using a spatial subdivision scheme. For example, a portion of skin surface 302 shown in FIG. 13 includes guide locations 1302, 1304, 1306, and 1308. A path 1310 is defined between guide locations 1302 and 1304. A path 1312 is defined between guide locations 1306 and 1308. Path 1310 includes line segments 1310a, 1310b, and 1310c. Path 1312 includes line segments 1312a, 1312b, 1312c, 1312d, and 1312e. For each line segment in the set of possible paths, an average surface normal vector of the skin surface along the line segment is determined. For example, FIG. 13 depicts average surface normal vector 1314 of skin surface 302 along line segment 1310b All neighboring segments on neighboring paths within a bounding box of the line segment are identified. For example, FIG. 13 depicts neighboring line segments 1312b, 1312c, and 1312d of neighboring path 1312 as being identified. The line segment and all neighboring line segments are projected to a plane perpendicular to the surface normal vector of the neighborhood local to line segment 1310b. For example, FIG. 13 depicts line segment 1310b and line segments 1312b, 1312c, and 1312d projected to plane 1316, which is perpendicular to surface normal vector 1314. The projections of the line segment and all neighboring line segments on the plane are examined to determine if any intersect.

In the present exemplary embodiment, paths that jump through the interior of the skin surface are identified and discarded. In particular, each path is traced to determine if one or more continuity criteria are met. A path is discarded if the one or more continuity criteria are not met. In one example, the one or more criteria include turning angles that are not near perpendicular, such as turning angles not between about 85 degrees to about 95 degrees. Thus, for each path, turning angles are determined between pair segments. If any of the turning angles of a path is near perpendicular, such as between about 85 degrees to about 95 degrees, the path is discarded.

Once all the shortest paths amongst all of the intersecting paths have been selected and paths that jump through the interior of the skin surface have been discarded, the remaining paths correspond to edges of the cells. Edges that are not shared at least twice trace the manifolds of the character, such as around the eyes of a bird. Edges that are shared more than twice are discarded because they lie inside the body of the character rather than on the skin surface.

During the partitioning process described above, the user can intervene and manually select a path to be discarded. The partitioning process then proceeds with the remaining set of paths to select the shortest paths amongst the intersecting paths and to discard paths that jump through the interior of the skin surface. The partitioning process can be iterated, particularly around critical animation regions on the skin surface, until the desired partitioning of the skin surface is obtained.

As mentioned above, the guides include shape guides, which define the shapes of the features, and deformer guides, which define the deformation properties of the features. The number and locations of shape guides are independent of the number and locations of deformer guides. Thus, in the present exemplary embodiment, a first partitioning process can be performed for the shape guides, and a second partitioning process can be performed for the deformer guides. Thus, in the first partitioning process, the vertices of each cell are shape guide locations for shape guides. In the second partitioning process, the vertices of each cell are deformer guide locations for deformer guides.

Exemplary pseudo-code for implementing an exemplary partitioning process is provided in FIG. 14. In FIG. 14, P and R are arrays of the vectors of positions and radii, respectively.

10. Weighting

After the skin surface has been partitioned into a plurality of cells, interpolation weight for a feature location is determined based on relative distance of the feature location to the guide locations that define the vertices of the cell within which the feature location is located. In particular, to determine interpolation weights for the feature location, the cell in which the feature location is located is first identified. For each guide location defining the vertices of the cell, a ratio is determined of a first distance from the guide location to the feature location in the cell and a second distance from the guide location to a point on an edge of the cell opposite the guide location through the feature location. The interpolation weights for the feature location are the determined ratios.

Figure 15:
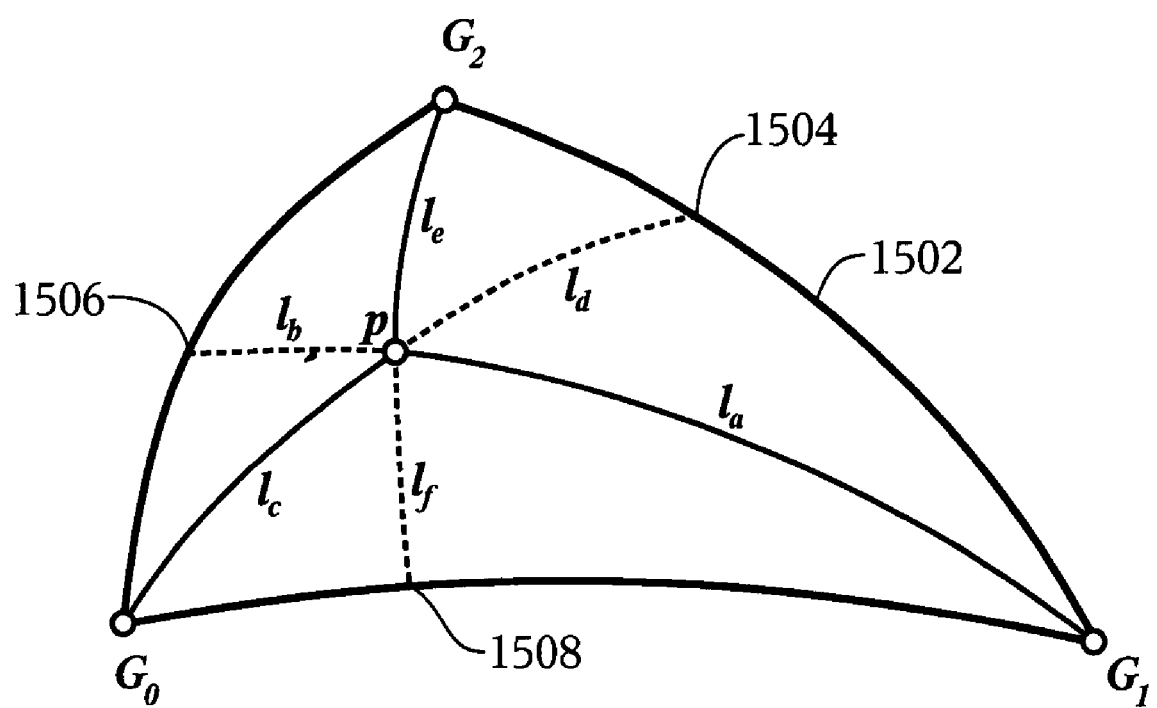
FIG. 15 depicts a feature location located within a cell.

For example, FIG. 15 depicts a feature locations, which is located within cell 1502. The vertices of cell 1502 are guide locations for guides G0, G1, and G2. Interpolations weights for feature location p can be determined with respect to each guide location.

In particular, with respect to guide G0, a ratio is determined of a first distance from the guide location for guide G0 to feature location p in cell 1502 (i.e., distance $l_c$) and a second distance from the guide location for guide G0 to a point 1504 on an edge of cell 1502 opposite the guide location for guide G0 through feature location p (i.e., distance $(l_c+l_d)$). Thus, the interpolation weight for feature location p with respect to guide G0 is $(l_c/(l_c+l_d))$.

With respect to guide G1, a ratio is determined of a first distance from the guide location for guide G1 to feature location p in cell 1502 (i.e., distance $l_a$) and a second distance from the guide location for guide G1 to a point 1506 on an edge of cell 1502 opposite the guide location for guide G1 through feature location p (i.e., distance $(l_a+l_b)$). Thus, the interpolation weight for feature location p with respect to guide G1 is $(l_a/(l_a+l_b))$.

With respect to guide G2, a ratio is determined of a first distance from the guide location for guide G2 to feature location p in cell 1502 (i.e., distance $l_e$) and a second distance from the guide location for guide G2 to a point 1508 on an edge of cell 1502 opposite the guide location for guide G2 through feature location p (i.e., distance $(l_e+l_f)$). Thus, the interpolation weight for feature location p with respect to guide G2 is $(l_e/(l_e+l_f))$.

Figure 16:
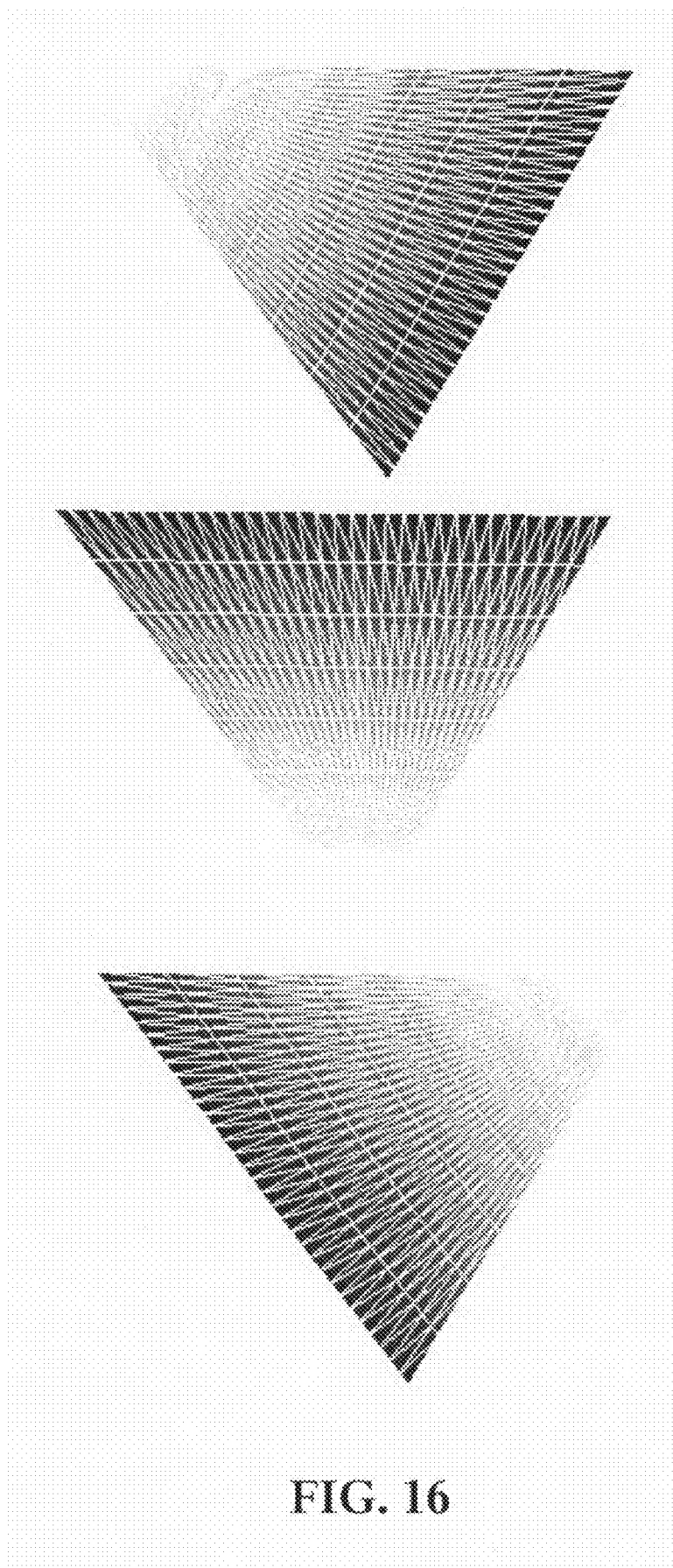
FIG. 16 depicts interpolation weights of guide locations within a triangular cell.

In the manner described above, interpolation weights with respect to guide locations for each guide for all the feature locations within a cell can be calculated. FIG. 16 depicts graphically the interpolation weights of guide locations of three guides throughout feature locations within a triangular cell. After calculating the interpolation weights for all the feature locations within a cell, the interpolation weights can be normalized so that all interpolation weights at any given feature location within the cell sum to unity.

As mentioned above, the guides include shape guides, which define the shapes of the features, and deformer guides, which define the deformation properties of the features. The number and locations of shape guides are independent of the number and locations of deformer guides. Thus, in the present exemplary embodiment, a first weighting process can be performed for the shape guides, and a second weighting process can be performed for the deformer guides. Thus, in the weighting partitioning process, the vertices of each cell are shape guide locations for shape guides. In the second weighting process, the vertices of each cell are deformer guide locations for deformer guides.

11. Instancing

After the guide locations and feature locations have been placed, an instancing process is used to create a feature at each feature location using interpolation weights. In particular, as mentioned above, two types of guides can be used (shape guides and deformer guides). Thus, in the present exemplary embodiment, the feature is created by independently applying the shape guides and deformer guides using interpolation weights. In particular, in a shape interpolation process, shape guides are applied to determine a feature's shape. In a deformer interpolation process, the deformer guides are applied to construct a deformer for the feature. Additionally, an instance deformation process is used to apply the deformer to the shape to produce the desired feature. A rendering processing can be used to project the feature produced from the instancing process to an image plane with the appropriate lighting and shading parameters.

12. Shape Interpolation

In the present exemplary embodiment, a feature's shape at a feature location is determined by a weighted blend of shape guides that define the vertices of the cell within which the feature location is located. In particular, to determine interpolation weights for the feature location, the cell in which the feature location is located is first identified. For each shape guide location defining the vertices of the cell, a ratio is determined of a first distance from the shape guide location to the feature location in the cell and a second distance from the shape guide location to a point on an edge of the cell opposite the shape guide location through the feature location. The interpolation weights for the feature location are the determined ratios. The shape for the feature is determined by applying the interpolation weights to their respective shape guides. See, Parke, F. I., Computer Generated Animation of Faces, *ACM '72: Proceedings of the ACM Annual Conference*, ACM Press, New York, N.Y., USA, ACM, pp. 451-457 (1972).

For example, with reference again to FIG. 15, assume guides G0, G1, and G2 are shape guides. Assume the interpolation weights for feature location p with respect to shape guides G0, G1, and G2 are 0.55, 0.15, and 0.30, respectively. Thus, the shape for the feature at feature location p is determined by applying the interpolation weights to shape guides G0, G1, and G2 (i.e., (0.55*G0)+(0.15*G1)+(0.30*G2)).

In the present exemplary embodiment, shape features of different resolution can be blended as long as the overall topology is similar (e.g., matching number of surfaces with like names and u, v orientations). In particular, guide surfaces with different resolution can be blended by determining the finest parametric representation that captures the topology of all contributing surfaces then subdividing any surface as necessary to match. This overall shape interpolation generally does not change over time, i.e., the resulting interpolation weights are the same for every frame of animation and could be cached and applied for all frames of animation at the expense of increased memory consumption.

Exemplary pseudo-code for implementing an exemplary shape interpolation process is provided in FIG. 17.

13. Deformer Interpolation

In the present exemplary embodiment, a deformer is constructed for the feature at the feature location using the deformer guides that define the vertices of the cell within which the feature location is located. As described above, the set of deformer guides is rigidly translated and rotated to their animated positions on the deformed skin surface.

For each feature, the non-zero contributing deformer guides with interpolation weights and indexes are translated to the feature's position and summed in a weighted blend to produce a single feature deformer. The deformer for the feature is determined by applying the predetermined interpolation weights to respective deformer guides.

Exemplary pseudo-code for implementing an exemplary deformer interpolation process is provided in FIG. 18.

14. Instance Deformation

In the present exemplary embodiment, the final shape of the feature is determined by applying the interpolated deformer to the interpolated shape in an instance deformation process. In the case of a feature, the interpolated deformer can account for the orientation of the feature. In particular, for a feature, a spine curve is defined that has a definite start position, which corresponds to the desired root position of the feature. The instance deformation process both rigidly and non-rigidly deforms the interpolated shape to conform to the spine curve.

Figure 19:
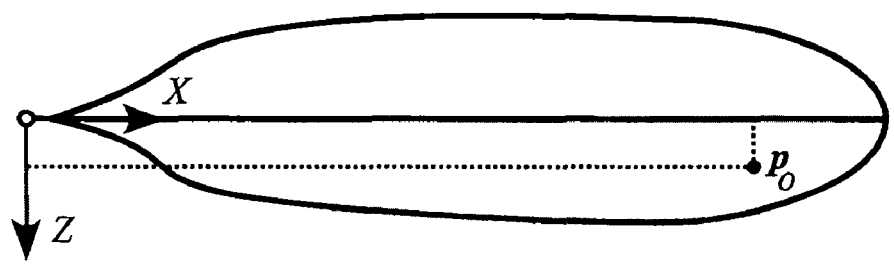
FIG. 19 depicts a feature shape, which is a feather.

For example, FIG. 19 depicts a resultant interpolated feature shape, in this case a feather. As depicted in FIG. 19, the feather is defined in the two dimensional space with coordinates (X, Z) by a set of points $p_0$.

In the instance deformation process, a two-manifold is constructed in $R^3$ emanating from the deformed skin surface attachment point. The feature points are then mapped onto the two-manifold to construct the final geometry of the feature.

In particular, one dimension of the two-manifold is defined by the deformers interpolated spine curve s(u). After interpolation, the spine curve is translated such that the start of the curve s(O) is at the feature's root attachment point on the skin surface. Furthermore, the spine curve is scaled up or down such that its entire chord length $\|s(n)\|$ is equal to the maximum X length of the interpolated shape.

In the present exemplary embodiment, the second dimension of the two-manifold is defined using a parallel transport frame. In particular, to construct the parallel transport frame, a direction vector b is determined. The spine curve is framed using the parallel transport frame and the direction vector for the feature. The feature points of the feature are then mapped using the parallel transport frame to construct the geometry of the feature.

Figure 20:
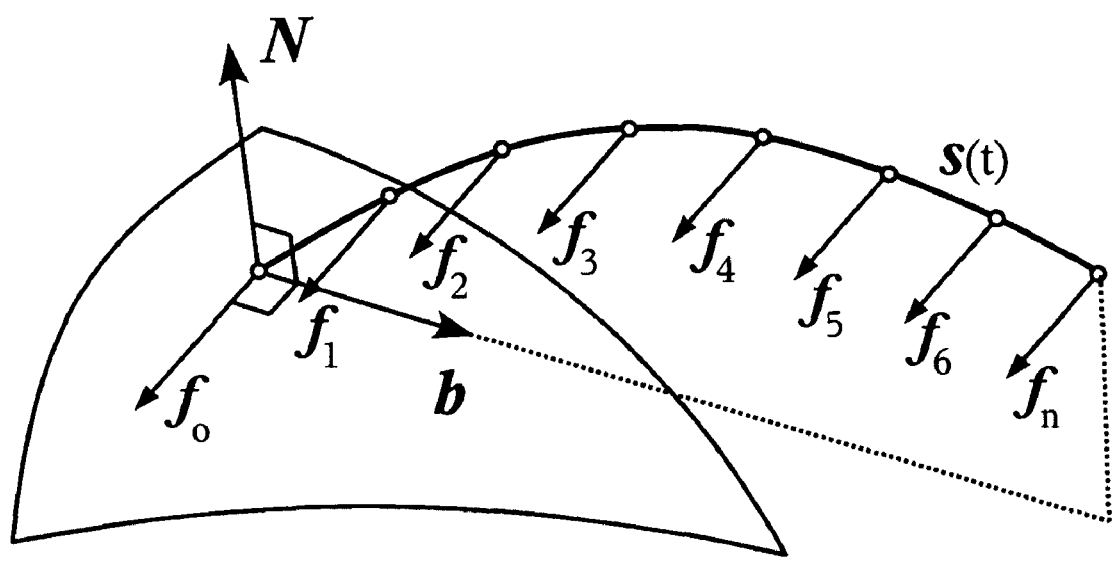
FIG. 20 depicts a parallel transport frame along a spine curve of a deformer.

With reference to FIG. 20, the direction vector b can be determined by determining a surface normal vector N at the start of the spine curve, which also corresponds to the feature's root attachment point on the skin surface. A tangent plane is defined that is perpendicular to the surface normal vector N. The orientation of the feature is obtained. The direction vector b is determined by projecting the orientation of the feature onto the tangent plane.

The starting frame vector of the parallel transport frame is the cross product of the direction vector and the surface normal vector (b×N). Subsequent frame vectors of the parallel transport frame extending from the starting frame vector are defined along the spine curve at discrete intervals.

FIG. 20 depicts an exemplary parallel transport frame along the spine curve at various discrete intervals $f_0, f_1, f_2, \ldots f_n$. See, Bishop, R. L., There is more than one way to frame a curve, *American Mathematical Monthly* 82, 3, pp. 246-251 (March 1975); and Hanson, A. J., and Ma, H., Parallel Transport Approach to Curve Framing, Tech. re., Indiana University (Feb. 23, 1995).

One advantage of using a parallel transport frame in animating feathers of a bird is that the feathers layer together without interpenetrating, in as much as possible without some additional knowledge of the neighboring feathers or skin surface.

Figure 21:
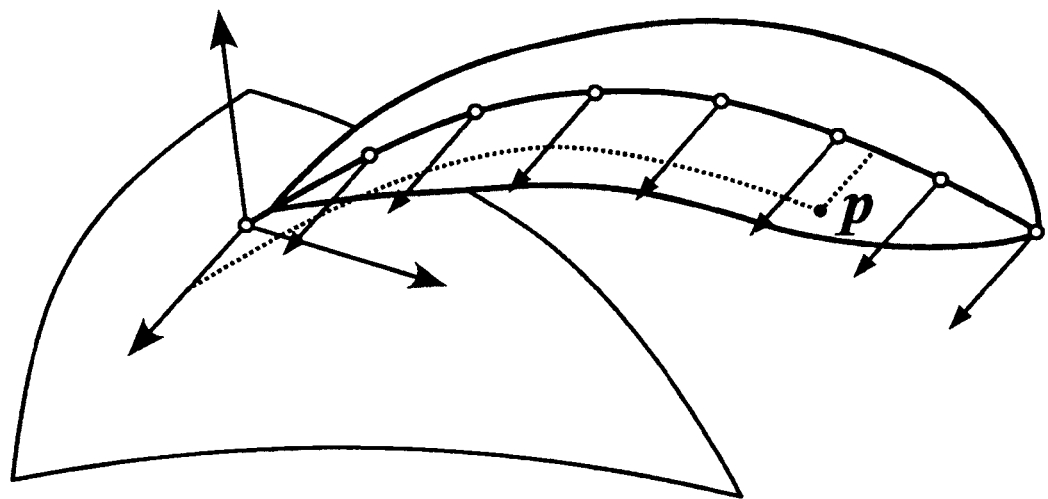
FIG. 21 depicts an interpolated feature using the deformer of FIG. 20.

FIG. 21 shows the result of mapping an exemplary point $p_0$ of the interpolated feature to the point p in the two-manifold deformer space. The mapping is done such that world space lengths are preserved.

Figure 22:
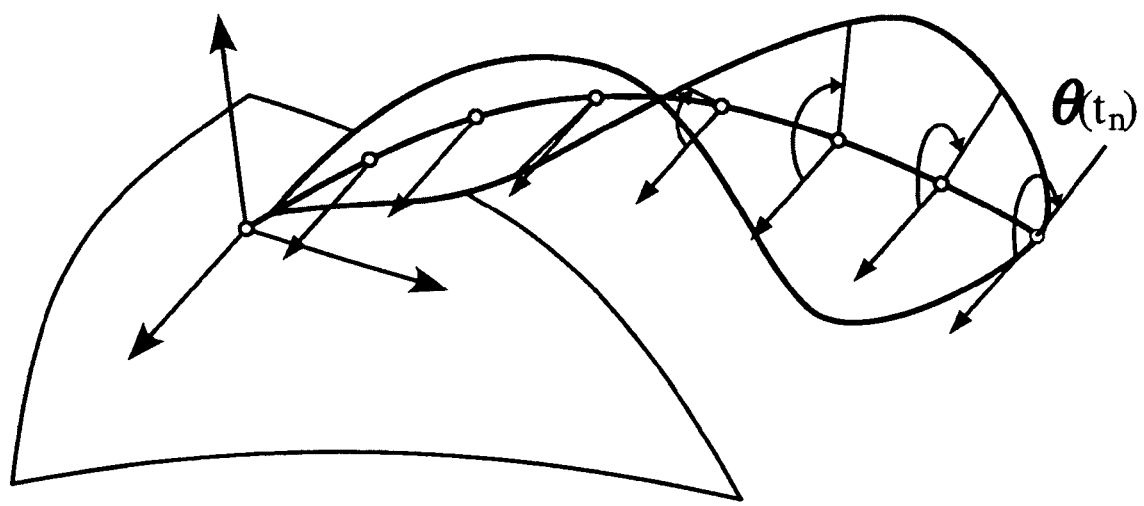
FIG. 22 depicts a feature with a twist function.

In one exemplary embodiment, an optional parameter can be used to add a twist function to the feature. Twist is a rotation about the spline s(t). Twist is encoded as a scalar function parameterized over the same domain as the spine curve, θ(t). If a non-zero twist value exists at an evaluated parameter, the deformer point is rotated about the spine curve s axis at the corresponding parametric point, (c'(t), by angle θ(t). FIG. 22 shows a feather twisting from 0° at the root to 180° at the tip.

Figure 23:
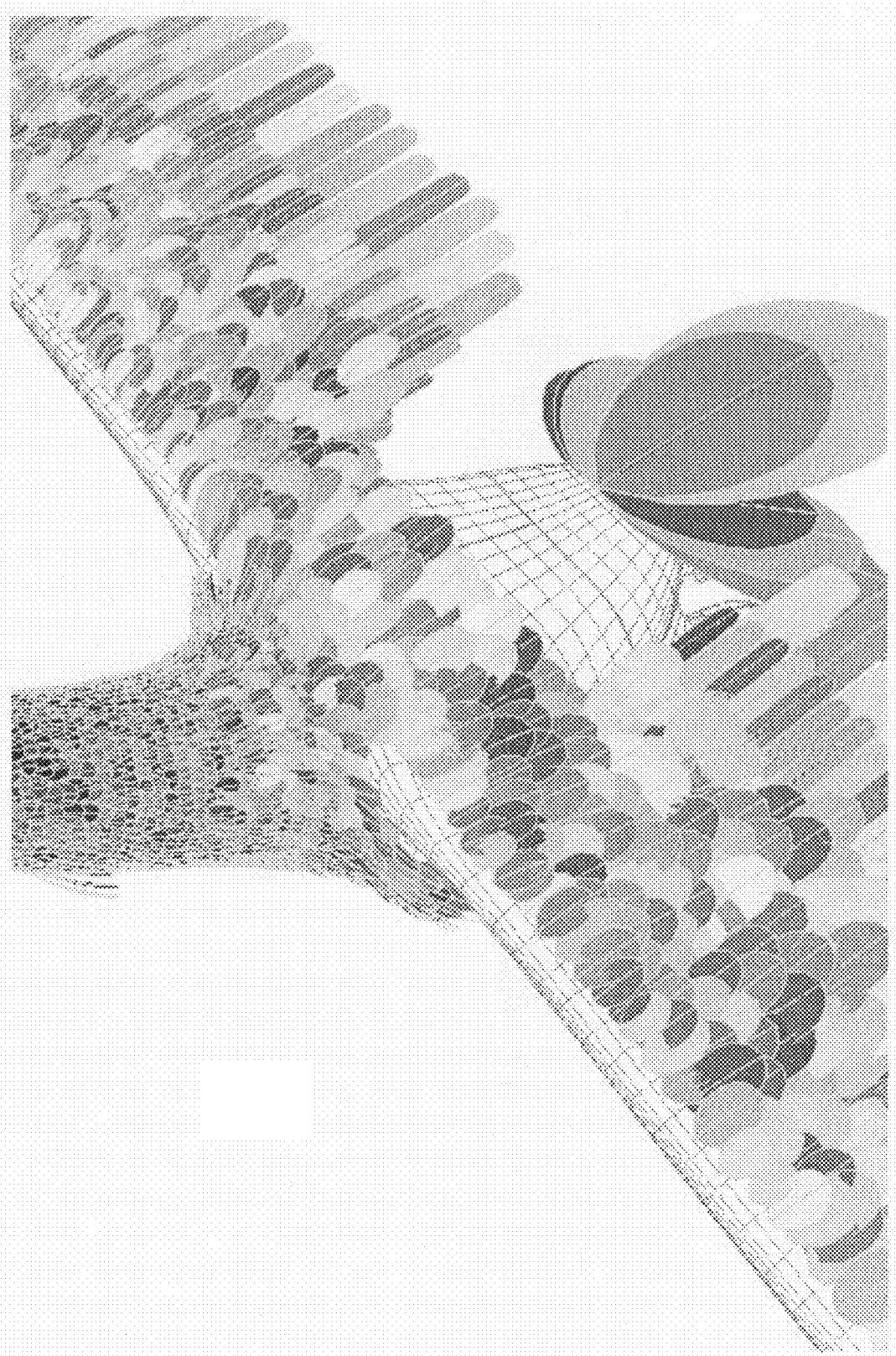
FIG. 23 depicts a bird character decorated with a set of feathers.

The final result of instancing a set of feathers on a bird is displayed in FIG. 23.

15. Animation Pipeline

FIG. 24-A depicts an exemplary embodiment of a setup system of an animation pipeline system. The setup system includes a feature placement unit 2402, a shape guide unit 2404, and a deformer guide unit 2406. It should be recognized, however, that the setup system can include any number of additional components.

Feature placement unit 2402 is configured to place feature locations for features on skin surface 2400. In particular, a feature placement engine 2408 is configured to perform the placement process described above by obtaining primitive density maps and reference surfaces to generate feature locations 2410.

Shape guide unit 2404 is configured to define shape guides and to place shape guide locations for the shape guides on skin surface 2400. In particular, a shape guide definition and placement engine 2412 is configured to define shape guides 2416. Shape guide definition and placement engine 2412 is also configured to perform the placement process described above to generate shape guide locations 2414. A shape guide partitioning and weighting engine 2418 is configured to perform the partitioning and weighting processes described above to generate the interpolation weights for the shape guides 2420.

Deformer guide unit 2406 is configured to define deformer guides and to place deformer guide locations for the deformer guides on skin surface 2400. In particular, a deformer guide definition and placement engine 2422 is configured to define deformer guides 2426. Deformer guide definition and placement engine 2422 is also configured to perform the placement process described above to generate deformer guide locations 2424. A deformer guide partitioning and weighting engine 2428 is configured to perform the partitioning and weighting processes described above to generate the interpolation weights for the deformer guides 2430.

FIG. 24-B depicts an exemplary embodiment of an animation system of the animation pipeline system. The animation system includes an instancer unit 2432. It should be recognized, however, that the animation and rendering system can include any number of additional components.

As depicted in FIG. 24-B, the animation system uses outputs from the setup system of the animation pipeline system. In particular, the outputs from the setup system include feature locations 2410, interpolation weights for shape guides 2420, shape guides 2416, interpolation weights for deformer guides 2430, and deformer guides 2426.

Instancer unit 2432 is configured to perform the instancing process described above. In particular, a shape interpolation engine 2434 is configured to perform the shape interpolation process described above. A deformer translation and interpolation engine 2436 is configured to perform the translation and deformer interpolation process described above. A deformation engine 2438 is configured to generate instanced features 2440 using the interpolation weights for the shape and deformer guides.

In the example of feathers being the instanced features, the animation pipeline system includes a preening system. The preening system includes a preener unit 2442, which deforms the feathers such that they do not intersect the skin surface or any other feather. See, U.S. patent application Ser. No. 11/408,805, titled LAYERING METHOD FOR FEATHER ANIMATION, filed on Apr. 21, 2006, which is incorporated herein by reference in its entirety for all purposes. It should be recognized, however, that the preening system can include any number of additional components.

FIG. 24-B depicts an exemplary embodiment of a rending system of the animation pipeline system. The rendering system includes a render engine 2444, which is configured to produce the rendered geometry. Appropriate lighting and shading parameters can be applied to project the features to an image plane. It should be recognized, however, that rendering system can include any number of additional components.

16. Database

In one exemplary embodiment, the skin surface and its attached features can be stored as information packages or data structures, which can be referred to simply as data. The geometric attributes are kept in a flexible data container, or a database, in order to handle many representations of the same feature at the different geometric complexity levels suitable for the different parts of the system. This is achieved by using a mapping for each of these attributes to a name tag and storing in an associative container. The associative containers provide a specialized set of functions in order to access the stored data by a key in an efficient manner.

The data creation and processing is fragmented into the individual tasks. These will be either executed procedurally such as the automatic placement or manipulated by a human user interface. Thus the data interface is preferably flexible enough to handle the arbitrary addition and removal of the data attributes.

All of the numeric and geometric information, such as surface, curve and mesh attribute information, are stored in an associative container called the generic data (GD). Each entry includes: 1) identification tag and 2) attribute value. For efficiency, the tags are constructed as a string and an integer number section, e.g., feather1 as the combination of the string feather and the integer number 1. Each string is also globally mapped to a number in the order they are encountered according to a counter in order to remove any constraints related to the length of the strings. This enables the strings to be essentially represented by two integer numbers and it also considerably improves the performance of the comparisons of the tags during the attribute value queries.

The structured shapes such as the surfaces and curves are represented by their conventional computer graphics algorithms. These can be the polygonal meshes, NURBS surfaces or curves. Each mesh, curve or surface element is then stored in the separate associative containers for the efficiency of the storage to reduce the memory or storage space related fragmentation. Thus, these are tagged initially with a geometry name and file name before getting stored within a GD structure. The attribute value retained in the GD object is then only a reference to the shapes stored in the appropriate geometry file.

The database examples for a shape and a deformer (combing) guide, a weighting and an instance are provided below. The data tag and the actual data are stored as pairs. The data type information precedes the actual data value. The Shared and Map keywords are the type names for the associative containers and they can be stored hierarchically. The numeric type names such as String, Float, Floats, Int, Ints are similar to the conventional data types in the computer language. The plural version of a data type indicates a vector. The geometric types such as Surf, Surfs, Curve are the complex data structures, they are stored as data handles in this database and managed separately in their own data containers.

17. Common Attributes

There are a common set of attributes described below for the features (instances) and the guides. These are the parametric surface descriptions for the skin surface and the grouping information for the different clumps of instances and guides. The grouping of the guides provides the discontinuities in the weighting of the instances such that a clear separation or parting can be achieved. These attributes are:

Instance Id: an integer identifier

Group Id: an integer describing the grouping information used during the weighting process.

Location: the skin surface name and the parametric location in relation to the skin surfaces.

Type Id: a logical identifier to send the specific guide related instructions during the instancing process.

Instance Name: this attribute is only for the instances and provides a final naming used during the coloring and lighting process.

18. Shape Guide Data

As mentioned above, the guides that are essentially describing the local characteristics of the instances that are invariant with respect to animation (deformation of the skin surface) are called the shape guides. In general, these are the surfaces augmented with the common and type special attributes. The type special attributes can provide the information necessary for the special effects and interpolation methods applied during the instancing process. The surfaces used for these shapes are generally loaded into the computer memory and stored on the storage media at the same time for efficiency. The common shape attributes are described below.

Each shape guide is constructed with its root at the origin (0, 0, 0) of a local space. Its primary axis (in this case the feather shaft) is oriented along the X-axis as in FIG. 19. It is sometimes useful to visualize the shape guides at their corresponding attachment location as shown in FIG. 8, though it should be noted that the orientation of the shape guides (protruding at right angles from the body) in the figure is not of any consequence.

FIG. 25 provides a exemplar data listing of an actual shape guide within its data file:
Surface File and Name: a file name to the surface container to load the shape surface with the given name.
Local Transformation: a matrix for the local transformations.

19. Deformer Guide Data

As mentioned above, the deformer guides essentially describe characteristics after, and in relation to, the skin deformations. In general, these are spinal curves augmented with the common and type special attributes. The type special attributes can provide the twisting information as well as any other special effects attributes. Similar to the shape guides, these guides are also handled together for efficiency.

FIG. 9 shows a complete set of deformer guides distributed on the skin of an exemplar bird character. FIG. 26 provides an exemplary data listing of an actual deformer guide within its data file.
Curve File and Name: ale name to the curve container to load the deformer curves with the given name.
Twists: (angle, parameter) value pairs that are interpolated along the deformer curve.
Local Transformation: a matrix for the local transformations.

20. Interpolation Weights Data

As mentioned above, interpolation weights for a feature location within a cell can be calculated with respect to the guides at the guide locations that define the vertices of the cell. FIG. 27 provides an exemplary data listing of interpolation weights for a feature location within its data file.

21. Instance Data

As mentioned above, a feature (instance) is created by applying the shape guides and animated deformer guides using interpolation weights for the shape and deformer guides. FIG. 28 provides an exemplary data listing of an instance within its data file.

22. Additional Embodiments

Additional embodiments relate to an apparatus for carrying out any one of the above-described processes, where the apparatus may include a computer for executing computer instructions related to the processes. In this context the computer may be a general-purpose computer including, for example, a processor, memory, storage, and input/output devices (e.g., monitor, keyboard, disk drive, Internet connection, etc.). However, the computer may include circuitry or other specialized hardware for carrying out some or all aspects of the processes. In some operational settings, the apparatus may be configured as a system that includes one or more units, each of which is configured to carry out some aspects of the processes either in software, in hardware or in some combination thereof.

At least some values based on the results of the processes can be saved, either in memory (e.g., RAM (Random Access Memory)) or permanent storage (e.g., a hard-disk system) for later use (e.g., display or further processing).

Additional embodiments also relate to a computer-readable medium that stores (e.g., tangibly embodies) a computer program for carrying out any one of the above-described processes by means of a computer. The computer program may be written, for example, in a general-purpose programming language (e.g., C, C++) or some specialized application-specific language. The computer program may be stored as an encoded file in some useful format (e.g., binary, ASCII).

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-implemented method of placing skin-attached features on a computer generated character, implemented by a computer, wherein the computer comprises a processor, the method comprising:
defining, using a processor, a set of placement points on at least a portion of a skin surface of the computer generated character;
for each placement point, defining, using the processor, a radius for the placement point;
for each placement point, determining, using the processor, a density value for the placement point, wherein the density value is a sum of weighted overlaps with neighboring placement points within the radius of the placement point, wherein the weighted overlaps are functions of the radius of the placement point; and
reducing, using the processor, the number of placement points in the set of placement points based on the density values.

2. The computer-implemented method of claim 1, wherein determining a density value for the placement point comprises:
identifying, using the processor, neighboring placement points within the radius of the placement point; and
for each identified neighboring placement point, determining, using the processor, a weighted overlap between the placement point and the neighboring placement point, wherein the weighted overlap is a function of the radius of the placement point.

3. The computer-implemented method of claim 2, wherein the function is a Gaussian falloff function, which decreases from the placement point toward the neighboring placement point along the radius.

4. The computer-implemented method of claim 1, wherein reducing the number of placement points comprises:
identifying, using the processor, a placement point with the highest density value;
identifying, using the processor, a neighboring placement point within the radius of the placement point with the next highest density value; and
merging the placement point and the neighboring placement point.

5. The computer-implemented method of claim 4, wherein merging the placement point and the neighboring placement point comprises:
adding a new placement point to the set of placement points, wherein the new placement point has a radius that is an average of the radius of the placement point and the radius of the neighboring placement point;
removing the placement point and the neighboring placement point from the set of placement points; and
determining, using the processor, new density values for the new placement point and other neighboring placement points within the radius of the placement point and the neighboring replacement point with the placement point and the neighboring placement point removed from the set of placement points.

6. The computer-implemented method of claim 1, further comprising:
   calculating, using the processor, inner products of a surface normal for each neighboring placement point with a surface normal of the placement point; and
   removing the neighboring placement points from the set of placement points with negative inner products.

7. The computer-implemented method of claim 1, further comprising:
   calculating, using the processor, a first acceleration for the placement point from the neighboring placement points, wherein the first acceleration is calculated using a model of the placement point anchored to each of the neighboring placement points with a spring; and
   calculating, using the processor, a second acceleration for the placement point from a location on the skin surface, wherein the second acceleration is calculated using a model of the placement point anchored to the location on the skin surface with another spring.

8. The computer-implemented method of claim 7, wherein the first acceleration is calculating based on the distance between the placement point and each of the neighboring placement points.

9. The computer-implemented method of claim 7, further comprising:
   calculating, using the processor, a total acceleration as a sum of the first and second accelerations; and
   determining, using the processor, new locations on the skin for the placement points using the total acceleration.

10. The computer-implemented method of claim 1, wherein the defined set of placement points correspond to feature locations for features of the character.

11. The computer-implemented method of claim 10, wherein the features are feathers.

12. The computer-implemented method of claim 10, wherein the defined set of placement points corresponds to guide locations for guides.

13. The computer-implemented method of claim 12, wherein the guides includes shape guides, which define the shapes of the features, and deformer guides, which define the deformation properties of the features.

14. A non-transitory computer-readable storage medium that stores a computer program for placing skin-attached features on a computer generated character, the computer program comprising instructions for:
   defining a set of placement points on at least a portion of a skin surface of the computer generated character;
   for each placement point, defining a radius for the placement point; for each placement point, determining a density value for the placement point, wherein the density value is a sum of weighted overlaps with neighboring placement points within the radius of the placement point, wherein the weighted overlaps are functions of the radius of the placement point; and
   reducing the number of placement points in the set of placement points based on the density values.

15. The non-transitory computer-readable storage medium of claim 14, wherein determining a density value for the placement point comprises instructions for:
   identifying neighboring placement points within the radius of the placement point; and for each identified neighboring placement point, determining a weighted overlap between the placement point and the neighboring placement point, wherein the weighted overlap is a function of the radius of the placement point.

16. The non-transitory computer-readable storage medium of claim 14,
   wherein reducing the number of placement points comprises instructions for: identifying a placement point with the highest density value;
   identifying a neighboring placement point within the radius of the placement point with the next highest density value; and
   merging the placement point and the neighboring placement point.

17. The non-transitory computer-readable storage medium of claim 16, wherein merging the placement point and the neighboring placement point comprises instructions for:
   adding a new placement point to the set of placement points, wherein the new placement point has a radius that is an average of the radius of the placement point and the radius of the neighboring placement point;
   removing the placement point and the neighboring placement point from the set of placement points; and
   determining new density values for the new placement point and other neighboring placement points within the radius of the placement point and the neighboring replacement point with the placement point and the neighboring placement point removed from the set of placement points.

18. The non-transitory computer-readable storage medium of claim 14, further comprising instructions for:
   calculating inner products of a surface normal for each neighboring placement point with a surface normal of the placement point; and
   removing the neighboring placement points from the set of placement points with negative inner products.

19. The non-transitory computer-readable storage medium of claim 14, further comprising instructions for:
   calculating a first acceleration for the placement point from the neighboring placement points,
   wherein the first acceleration is calculated using a model of the placement point anchored to each of the neighboring placement points with a spring; and
   calculating a second acceleration for the placement point from a location on the skin surface,
   wherein the second acceleration is calculated using a model of the placement point anchored to the location on the skin surface with another spring.

20. The non-transitory computer-readable storage medium of claim 19, wherein the first acceleration is calculating based on the distance between the placement point and each of the neighboring placement points.

21. The non-transitory computer-readable storage medium of claim 19, further comprising instructions for:
   calculating a total acceleration as a sum of the first and second accelerations; and determining new locations on the skin for the placement points using the total acceleration.

22. The non-transitory computer-readable storage medium of claim 14, wherein the defined set of placement points correspond to feature locations for features of the character.

23. The non-transitory computer-readable storage medium of claim 22, wherein the features are feathers.

24. The non-transitory computer-readable storage medium of claim 22, wherein the defined set of placement points corresponds to guide locations for guides.

25. The non-transitory computer-readable storage medium of claim 24, wherein the guides includes shape guides, which define the shapes of the features, and deformer guides, which define the deformation properties of the features.

26. A computer system configured to place skin-attached features on a computer generated character, the system comprising:
- a processor;
- a placement unit configured to use the processor to:
  - define a set of placement points on at least a portion of a skin surface of the computer generated character;
  - for each placement point, define a radius for the placement point;
  - for each placement point, determine a density value for the placement point, wherein the density value is a sum of weighted overlaps with neighboring placement points within the radius of the placement point, wherein the weighted overlaps are functions of the radius of the placement point; and
  - reduce the number of placement points in the set of placement points based on the density values; and
- a data store configured to store the second set of placement points.

* * * * *

UNITED STATES PATENT AND TRADEMARK OFFICE
CERTIFICATE OF CORRECTION

| | | |
|---|---|---|
| PATENT NO. | : 7,859,546 B2 | Page 1 of 1 |
| APPLICATION NO. | : 11/796650 | |
| DATED | : December 28, 2010 | |
| INVENTOR(S) | : Galen G. Gornowicz et al. | |

It is certified that error appears in the above-identified patent and that said Letters Patent is hereby corrected as shown below:

In column 5, line 17-22, delete "In the present exemplary embodiment, the number of placement points is reduced by identifying a point with the highest density value. In particular, a neighboring placement point with the next highest density value within the radius of the point is identified. The two placement points are then merged." and insert the same on line 18 i.e., below "(i.e., 1.2+0.6)." as a new paragraph.

In column 18, line 33, after "1310b" insert -- . --.

In column 9, line 37, delete "locations," and insert -- location p, --, therefor.

In column 9, line 44, delete "$I_c$)" and insert -- $l_c$) --, therefor.

In column 13, line 29, delete "FEATHER." and insert -- FEATHER --, therefor.

Signed and Sealed this
Twelfth Day of April, 2011

David J. Kappos
*Director of the United States Patent and Trademark Office*